US011919487B2

(12) United States Patent
Davidson et al.

(10) Patent No.: US 11,919,487 B2
(45) Date of Patent: Mar. 5, 2024

(54) CLEANING OF A SENSOR LENS OF A VEHICLE SENSOR SYSTEM

(71) Applicant: Volvo Car Corporation, Gothenburg (SE)

(72) Inventors: Geoffrey Davidson, Landvetter (SE); Per Nordenström, Mölndal (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 17/364,100

(22) Filed: Jun. 30, 2021

(65) Prior Publication Data
US 2023/0001890 A1     Jan. 5, 2023

(51) Int. Cl.
| | |
|---|---|
| *B60S 1/56* | (2006.01) |
| *B60R 11/04* | (2006.01) |
| *B60S 1/52* | (2006.01) |
| *B60S 1/62* | (2006.01) |
| *B60R 11/00* | (2006.01) |

(52) U.S. Cl.
CPC ............... *B60S 1/566* (2013.01); *B60R 11/04* (2013.01); *B60S 1/52* (2013.01); *B60S 1/62* (2013.01); *B60R 2011/004* (2013.01); *B60R 2011/0092* (2013.01); *B60R 2011/0094* (2013.01)

(58) Field of Classification Search
CPC .... B60S 1/566; B60S 1/52; B60S 1/62; B60S 1/46; B60R 11/04; B60R 1/00; B60R 2300/8066; G06K 9/00791; H04N 5/2171; H04N 5/2257; H04N 5/217; H04N 5/225

USPC ................................................... 15/250.001
See application file for complete search history.

(56) References Cited

U.S. PATENT DOCUMENTS

| | | |
|---|---|---|
| 8,497,907 B2 | 7/2013 | Barefoot et al. |
| 9,802,656 B1 | 10/2017 | Williams et al. |
| 10,430,833 B2 | 10/2019 | Newman |
| 10,491,793 B2 | 11/2019 | Ghannam et al. |
| 10,589,724 B2 | 3/2020 | Krishnan et al. |
| 2006/0171704 A1 | 8/2006 | Bingle et al. |
| 2016/0304029 A1 | 10/2016 | Villanueva et al. |

(Continued)

FOREIGN PATENT DOCUMENTS

| | | | |
|---|---|---|---|
| DE | 102014117165 | 5/2016 | |
| EP | 3690805 A1 * | 8/2020 | ........... B60Q 1/0023 |

(Continued)

*Primary Examiner* — Katina N. Henson
(74) *Attorney, Agent, or Firm* — Amin, Turocy & Watson, LLP

(57) ABSTRACT

Systems, devices, system-implemented methods, computer-implemented methods and/or computer program products are provided that can facilitate movement and/or cleaning of a sensor lens of a sensor system for a vehicle body. In one embodiment, the sensor system can comprise a sensor lens having a retractable portion that is moveable at least partially into and out of a chamber. The sensor system also can comprise a cleaning assembly configured to clean the retractable portion disposed within the chamber and at least partially separated from airflow exterior to the chamber. According to another embodiment, a sensor system for a vehicle body can comprise a moveable sensor lens, a cover, and a cleaning assembly configured to clean the sensor lens at least partially concealed by the cover from an environment about the vehicle body.

20 Claims, 10 Drawing Sheets

(56) References Cited

U.S. PATENT DOCUMENTS

| | | | |
|---|---|---|---|
| 2016/0323484 A1 | 11/2016 | Moenig et al. | |
| 2017/0346997 A1 | 11/2017 | Sato et al. | |
| 2018/0079392 A1* | 3/2018 | Karasik | B60S 1/56 |
| 2018/0361998 A1* | 12/2018 | Renaud | B60R 11/04 |
| 2019/0016306 A1* | 1/2019 | Krishnan | G05D 1/024 |
| 2019/0250017 A1* | 8/2019 | Greiner | G01D 11/245 |
| 2019/0322245 A1* | 10/2019 | Kline | B60S 1/0848 |
| 2020/0128153 A1 | 4/2020 | Hartranft et al. | |
| 2020/0149933 A1 | 5/2020 | Robertson et al. | |
| 2020/0216034 A1 | 7/2020 | Velasco et al. | |
| 2020/0223401 A1* | 7/2020 | Little | B60S 1/56 |

FOREIGN PATENT DOCUMENTS

| | | |
|---|---|---|
| WO | 2016083317 | 6/2016 |
| WO | 2019238671 | 12/2019 |

\* cited by examiner

CLEANING OF A SENSOR LENS OF A VEHICLE SENSOR SYSTEM

TECHNICAL FIELD

One or more embodiments described herein relate to a sensor system for a vehicle, and more specifically, to an on-board and retractable sensor system for a vehicle.

BACKGROUND

Sensor systems continue to be leveraged for controlling and/or assisting one or more vehicle functions, such as vision-assist functions including self-driving, direction assistance, backing up, parking, tire and/or wheel inspection, underbody inspection and/or obstacle avoidance. These sensor systems typically are constructed for being carried on-board with a vehicle and can include, but are not limited to, radar, lidar, thermal imaging, cameras, movement sensors and/or the like.

SUMMARY

The following presents a summary to provide a basic understanding of one or more embodiments described herein. This summary is not intended to identify key or critical elements, or to delineate any scope of the particular embodiments and/or any scope of the claims. The sole purpose of the summary is to present concepts in a simplified form as a prelude to the more detailed description that is presented later. In one or more embodiments described herein, devices, systems, methods and/or apparatuses are described that can facilitate movement and/or cleaning of a sensor lens of a sensor system.

Sensor systems constructed for being carried on-board with a vehicle can include sensitive electronics. One or more sensor lenses protecting the sensitive electronics can be obscured by environmental conditions, objects and/or substances coming off the road and/or from another vehicle, and/or other obscuring elements. This obscuring can occur numerous times during a single use of a sensor system. Yet, a sensor of the sensitive electronics can be most efficient when viewing and/or sensing through a clean, and non-obscured, sensor lens. Further, even when providing cleaning of a sensor lens, the offending obscuring element, substance and/or liquid can instead be unintendedly directed, moved and/or flushed towards another sensor system, vehicle window and/or vehicle occupant, such as where a window, roof opening, convertible roof and/or removable vehicle body portion can expose the vehicle occupant to an environment about the vehicle.

To account for one or more of these issues, subject matter described herein includes one or more embodiments that can employ various techniques to efficiently clean a sensor lens in at least a partially contained manner Employing one or more such techniques, waste, such as run-off, debris and/or other substances from the cleaning of a sensor lens can be directed towards a base supporting the vehicle, and thus away from the sensor system and/or from one or more other sensor systems, vehicle viewing panels (e.g., windows) and/or vehicle occupants. This cleaning can be facilitated by a retractable sensor lens, which retractability further can aid in reducing and/or preventing obscuring of the sensor lens.

According to one embodiment, a sensor system for a vehicle body can comprise a sensor lens having a retractable portion that is moveable at least partially into and out of a chamber. The sensor system also can comprise a cleaning assembly configured to clean the retractable portion disposed within the chamber and at least partially separated from airflow exterior to the chamber.

According to another embodiment, a sensor system for a vehicle body can comprise a moveable sensor lens, a cover, and a cleaning assembly configured to clean the sensor lens at least partially concealed by the cover from an environment about the vehicle body.

According to yet another embodiment, a method of operating a sensor system at a vehicle body can comprise cleaning, by the sensor system, a retractable portion of a sensor lens disposed within a chamber and at least partially separated from airflow exterior to the chamber.

In one or more of the above-provided embodiments, a fluid management system can direct fluid expelled by the cleaning away from one or more viewing panels at the vehicle body.

In one or more of the above-provided embodiments, a sensor housing retaining the sensor lens can have a cover that can form an exterior portion of the vehicle body when the sensor lens is retracted into the chamber.

In one or more of the above-provided embodiments, a heat sink of the sensor system can be at least partially exposed to an environment external to the vehicle body by a partial deployment of the sensor lens from the chamber.

These one or more embodiments can accordingly provide at least one or more self-protection, self-cleaning and/or self-cooling aspects and/or functions.

By retracting at least partially into a chamber at the vehicle body, the sensor lens can be protected from one or more of environmental conditions, objects and/or substances coming off the road and/or from another vehicle. This can be the case such as when the sensor system is not being utilized or in view of one or more undesirable environmental and/or road conditions. Retractability of one or more aspects of the sensor system also can provide a desirable aesthetic, such as absent a sensor system or portion thereof interrupting a contour and/or other design feature of the vehicle.

Self-cleaning of at least the sensor lens can be provided by the cleaning assembly of the sensor system. The self-cleaning can enable the sensor system to be utilized for longer use periods and/or to have greater availability even in less than optimal and/or less than desirable environmental and/or road conditions. That is, the sensor system can enable temporary and/or intermittent cleaning of at least the sensor lens to allow for continued use of the sensor system during one or more user periods.

Providing cleaning of the sensor lens when at least partially concealed by the cover from an environment about the vehicle body, and/or when at least partially separated from airflow exterior to the chamber, can enable enhanced cleaning of the sensor lens. That is, where the cleaning assembly includes the use of a fluid, the at least partial, nearly full and/or full concealing, covering and/or positioning of the sensor lens relative to external airflow and/or environmental conditions can minimize and/or prevent fluid from the cleaning assembly and/or removed debris from instead moving to another undesired portion of the vehicle and/or vehicle body. For example, such fluid and/or debris can be minimized and/or prevented from instead being deposited on a viewing panel and/or actuating a rain sensor.

As used herein, the term "fluid" can refer to water, air, cleaning liquid, another liquid, an aqueous and/or gaseous substance, and/or any combination thereof. As used herein, the term "viewing panel" can refer to a window, windshield and/or another clear, transparent and/or at least partially translucent panel of the vehicle, such as of the vehicle body.

Additionally and/or alternatively, where the cleaning assembly includes the use of a fluid, the fluid management system can reduce and/or altogether prevent such fluid and/or debris removed from the sensor lens from being directed towards a viewing panel of the vehicle. Directing fluid and/or debris away from a viewing panel can aid in keeping a rain sensor at the viewing panel from being triggered merely by the cleaning assembly of the sensor system.

Furthermore, in that the sensor system can produce heat during use and/or can be exposed to a hot environment, and/or to direct and/or indirect sunlight, it also is helpful that the retractability of the sensor system can be utilized to cool the sensor system. The sensor lens can be partially deployed to allow for air to pass into the chamber, such as over one or more heat sinks of the sensor system. In one or more embodiments, this partially retracted position of the sensor lens can produce a venturi effect that can draw air into the chamber.

DESCRIPTION OF THE DRAWINGS

One or more exemplary embodiments are described below in the Detailed Description section with reference to the following drawings.

DETAILED DESCRIPTION

The following detailed description is merely illustrative and is not intended to limit embodiments and/or application or uses of embodiments. Furthermore, there is no intention to be bound by any expressed and/or implied information presented in the preceding Background and/or Summary sections, and/or in this Detailed Description section.

To account for one or more issues with the use of a sensor system at a vehicle, such as obscuring of a sensor lens, cleaning of the sensor lens, overspray from cleaning, protection while not in use, aesthetics and/or heat buildup, one or more embodiments described herein can be employed. Such sensor system can be employed at any suitable location of a vehicle, such as at an external location of a vehicle body. The sensor system can provide one or more of selective protection of a sensor lens, desirable aesthetics, easy serviceability, selective sensor lens cleaning and/or modular manufacturability, as will be described below.

It will be appreciated that while one or more sensor systems are described below with reference to a wheeled vehicle, such as an automobile, the one or more embodiments described herein are not limited to this use. Indeed, the one or more sensor systems described herein can be utilized with any of a military vehicle, marine vehicle such as a boat or marine drone, winged vehicle such as a plane, and/or rotor-ed vehicle such as a helicopter or drone. Likewise, usage can extend to a robot and/or any suitable mobile and/or stationary device having use of a sensor.

As used herein, the term "sensor" can refer to any one or more of visual, thermal, bio-signature, electrical signature, light and/or chemical sensors, lidar, radar, sonar and/or any other sensor.

One or more of these embodiments are now described with reference to the figures, where like referenced numerals are used to refer to like elements throughout. In the following description, for purposes of explanation, numerous specific details are set forth in order to provide a more thorough understanding of the one or more embodiments. It is evident in one or more cases, however, that the one or more embodiments can be practiced without these specific details. Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein.

Turning now to the Figures, one or more embodiments described herein can include one or more systems, apparatuses and/or system-implemented methods that can facilitate movement and/or cleaning of a sensor lens of the sensor system.

Figure 1A:
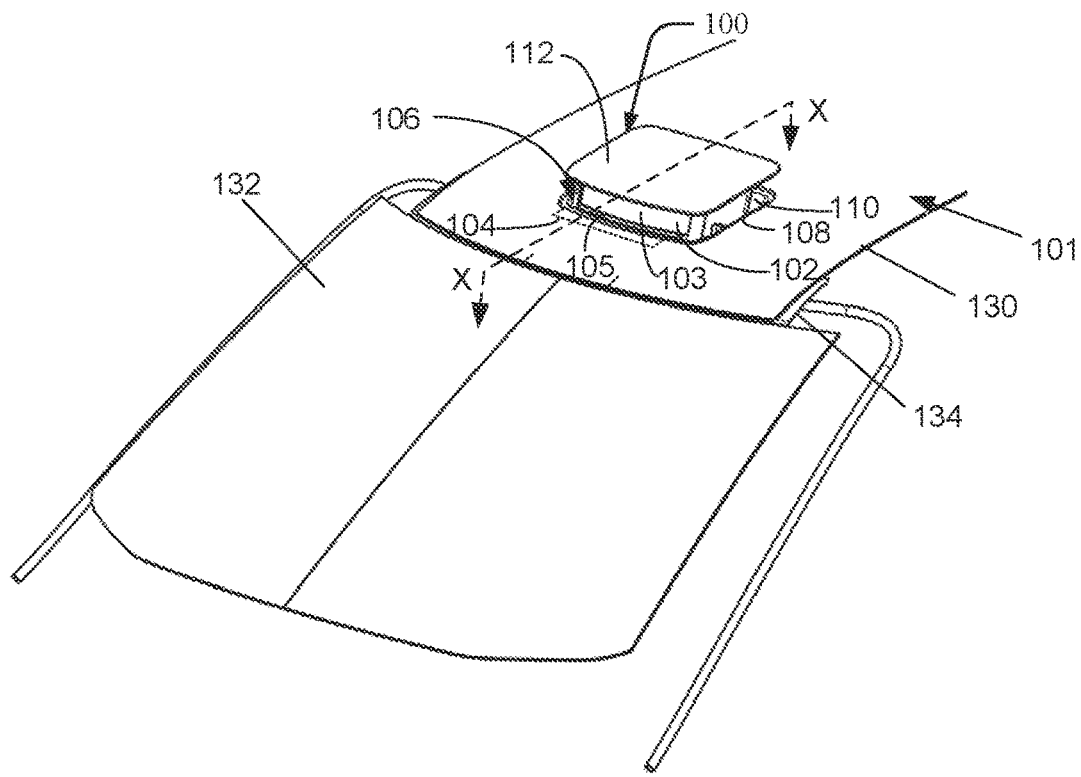
FIG. 1A illustrates a front orthogonal view of a sensor system, for a vehicle body, that can facilitate movement and/or cleaning of a sensor lens of the sensor system. As illustrated, the sensor system includes a sensor module at least partially deployed from a chamber at a vehicle body, in accordance with one or more embodiments described herein.
Figure 1B:
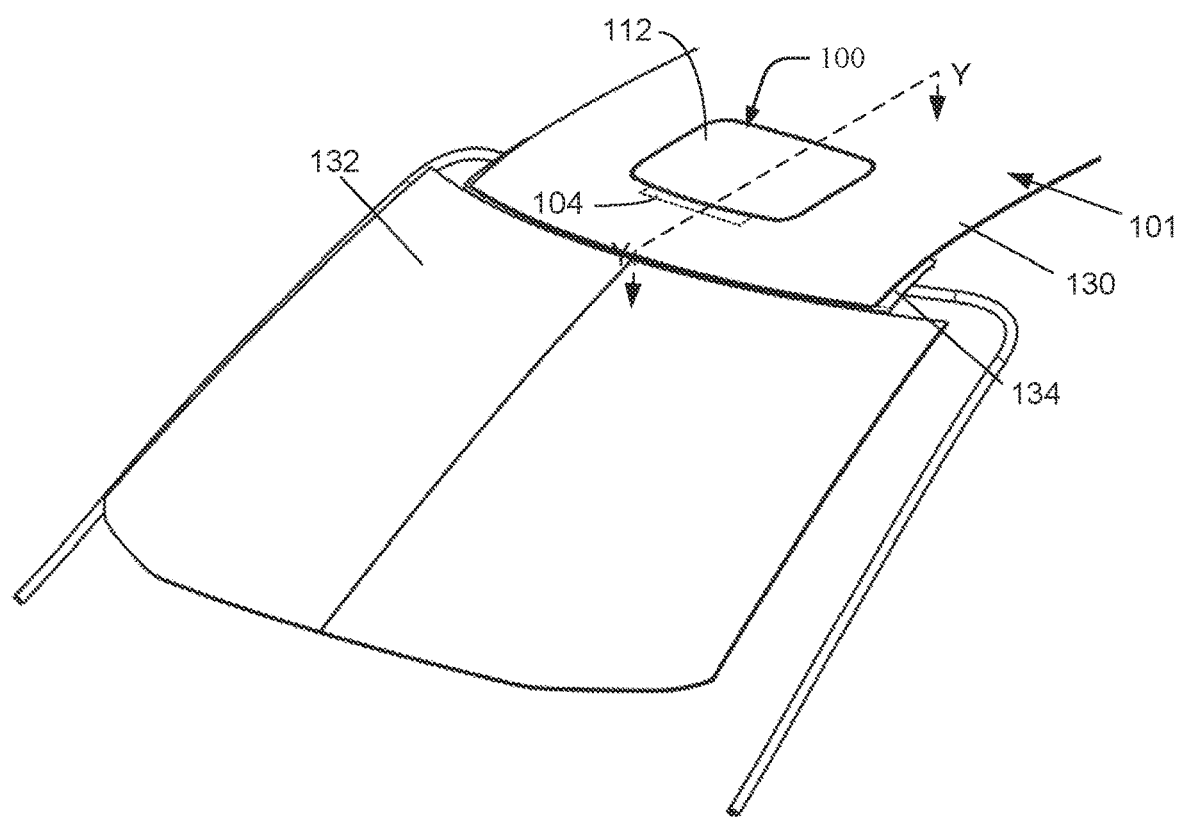
FIG. 1B illustrates a front orthogonal view of the sensor system of FIG. 1A with the sensor module retracted into the chamber at the vehicle body, in accordance with one or more embodiments described herein.

Looking first generally to FIGS. 1A and 1B, FIG. 1A illustrates at least a sensor system 100 disposed at a vehicle body 101 of a vehicle. The sensor system 100 can include at least a sensor lens 102 and a cleaning assembly 104. The sensor lens 102 can have a retractable portion 103 that can be moveable at least partially into and out of a chamber 106. That is, the sensor lens 102, and specifically the retractable portion 103, can be moveable between a retracted position within the chamber 106 (see, e.g., FIG. 1B) and a deployed position out of the chamber (see, e.g., FIG. 1A). As shown at FIG. 1A, a non-retractable portion 105 of the sensor lens 102 can be movable with the retractable portion 103, but can remain within the chamber 106 (e.g., not moving past a lip 108 of a chamber housing 110 defining the chamber 106).

The cleaning assembly 104 can be configured to clean the retractable portion 103 of the sensor lens 102 disposed within the chamber 106 and at least partially separated from airflow exterior to the chamber 106. That is, when the retractable portion 103 (e.g., all or a sub-portion thereof) is disposed within the chamber 106, the cleaning assembly 104 can clean the retractable portion 103 (e.g., all or the sub-portion thereof within the chamber 106). In this retracted position of the retractable portion 103 (e.g., shown at FIG. 1B), the retractable portion 103 can be at least partially separated from airflow exterior to the chamber 106, such as airflow moving about the vehicle body 101.

Looking again to FIGS. 1A and 1B, in the same or another embodiment, the sensor system 100 for a vehicle body 101 can include the moveable sensor lens 102, a cover 112 and the cleaning assembly 104. The cleaning assembly 104 can be configured to clean the sensor leans 102 at least partially concealed by the cover 112 from an environment about the vehicle body 101. The sensor lens 102 can be moveable, such as relative to the vehicle body 101, between the deployed position of the sensor lens 102 illustrated at FIG. 1A and the retracted position of the sensor lens 102 illustrated at FIG. 1B. The cover 112 can at least partially cover the sensor lens 102 to thereby at least partially conceal the sensor lens 102 and/or the cleaning assembly 104.

In view of these aforementioned embodiments, cleaning the sensor lens 102 when at least partially concealed by the cover 112 from an environment about the vehicle body 101, and/or when separated from airflow exterior to the chamber 106, can enable enhanced cleaning of the sensor lens 102. That is, where the cleaning assembly 104 includes the use of a fluid, the at least partial concealing, covering and/or positioning of the sensor lens 102 relative to external airflow and/or environmental conditions can minimize and/or prevent fluid from the cleaning assembly 104 and/or removed debris from instead moving to another visible portion of the vehicle and/or vehicle body 101. For example, such fluid and/or debris can be minimized and/or prevented from instead being deposited on a viewing panel and/or actuating a rain sensor.

Figure 2:
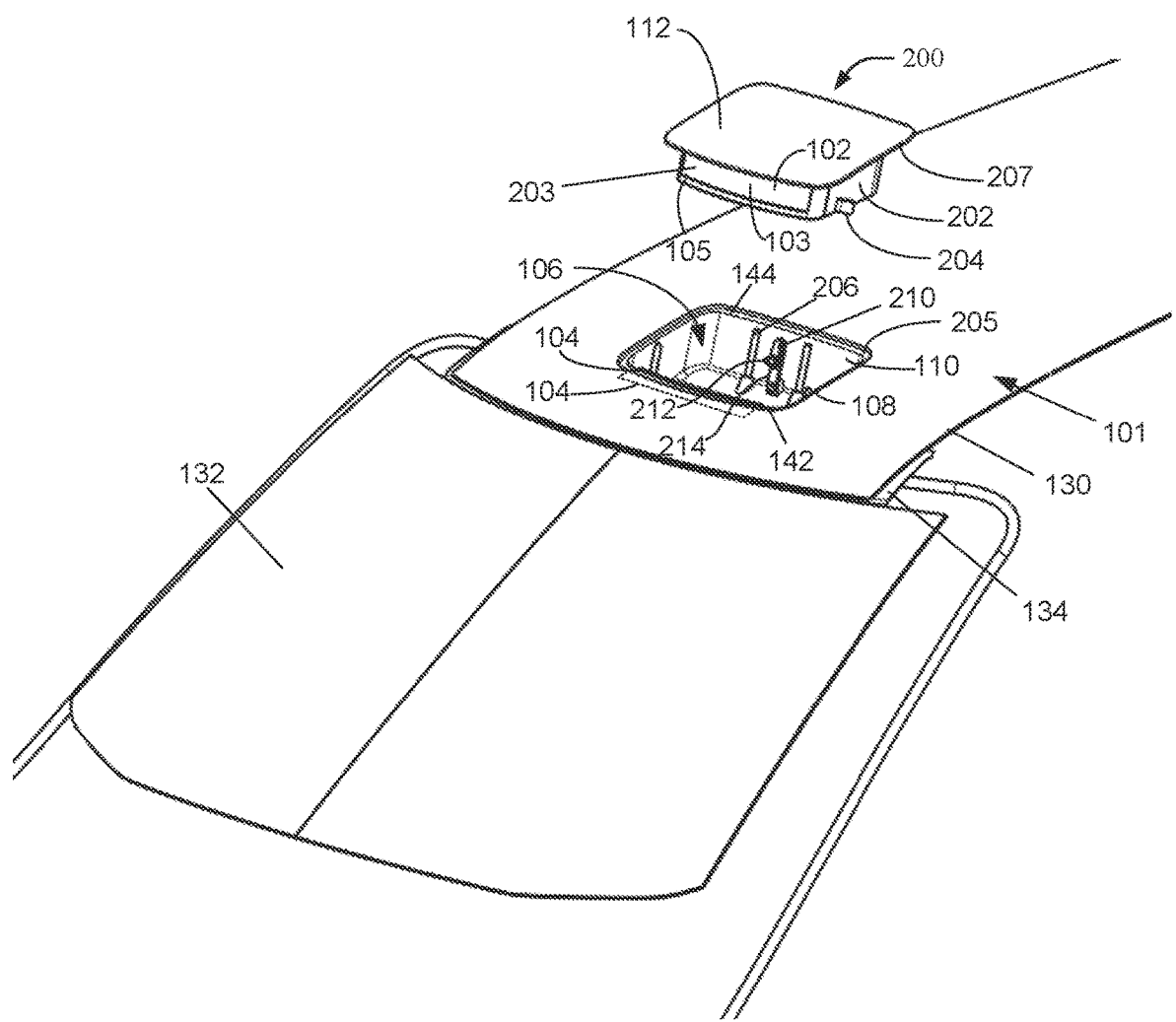
FIG. 2 illustrates a front orthogonal view of the sensor system of FIG. 1A with the sensor module removed for serviceability and for viewing one or more aspects within the chamber at the vehicle body, in accordance with one or more embodiments described herein.

Looking still to FIGS. 1A and 1B, and also now to FIG. 2, additional details of the sensor system 100 are illustrated. That is, in one or more of the aforementioned embodiments, and/or in a different embodiment, the sensor system 100 can include one or more additional components and/or aspects.

For example, FIGS. 1A, 1B and 2 illustrate a partial vehicle body 101 of a vehicle. The vehicle body 101 illustrated includes at least a roof portion 130, a front windshield 132 and a windshield support 134. As shown, the windshield support 134 can provide coupling between the roof portion 130 and the front windshield 132.

The chamber housing 110 can be disposed at an opening 142 at the vehicle body 101, and specifically at the roof portion 130. The chamber housing 110 can be considered as a part of the sensor system 100 in one or more embodiments, or as separate from the sensor system 100 in one or more other embodiments. It will be appreciated that any other location along a vehicle and/or vehicle body 101 can be employed for positioning the chamber housing 110 and sensor system 100.

The chamber housing 110 can be retained against the vehicle body 101, directly and/or indirectly, by mechanical compression, fasteners, adhesive and/or other mechanical and/or chemical structures. In one embodiment, the lip 108 of the chamber housing 110 can be sealed relative to the vehicle body 101, such as relative to the roof portion 130, to prevent fluid movement and/or ingress between the roof portion 130 and the lip 108.

The chamber housing 110 defines the chamber 106 for receiving, directing and/or supporting a sensor module 200 of the sensor system 100. The chamber housing 110 and the sensor module 200 can be jointly configured to allow for the movement of the sensor lens 102 into and out of the chamber 106.

As illustrated, the sensor module 200 can include a sensor housing 202 that can retain the sensor lens 102 and can be jointly moveable with the sensor lens 102 between the retracted position of the sensor lens 102 (e.g., at FIG. 1B) and the deployed position of the sensor lens 102 at least partially disposed external to the chamber 106 (e.g., at FIG. 1A). The sensor lens 102 can be retained at the sensor housing 202 via any suitable method, such as, but not limited to mechanical compression, fasteners, adhesive and/or other mechanical and/or chemical structures.

It will be appreciated that the sensor lens 102, and particularly the retractable portion 103, is illustrated at FIG. 1B as being fully retractable into the vehicle body 101, and particularly into the chamber 106. In one or more embodiments, the sensor lens 102 can be partially retracted into the chamber 106 and/or the vehicle body. In one or more embodiments, the chamber 106 and/or the chamber housing 110 can be less than fully disposed within the vehicle body 101. In one or more embodiments, the non-retractable portion 105 of the sensor lens 102 can be omitted.

Additionally and/or alternatively, although the sensor lens 102 is illustrated as having a flat and/or planar outer surface 203, the sensor lens 102 and/or outer surface 203 can have a different shape and/or configuration in one or more other embodiments. Additionally and/or alternatively, the chamber housing 110 can be incorporated into, and/or the chamber 106 can be formed at, the vehicle body 101, such as at a roof panel of the roof portion 130.

The sensor module 200 can include the cover 112. The cover 112 can be connectable to the sensor housing 202 by any suitable method, such as, but not limited to mechanical compression and/or fasteners. The cover 112 is an exterior portion of the sensor system 100 that can form an exterior portion of the vehicle body 101, such as when the sensor lens 102 is at least partially retracted into the chamber 106. That is, the cover 112 can be moveable with the sensor lens 102, and thus also with the sensor housing 202, relative to the chamber housing 110 and the vehicle body 101. Via this movement, the cover 112 can be moveable into a position (e.g., at FIG. 1B) adjacent and/or engaged with the vehicle body 101 (e.g., the roof portion 130) to form an exterior portion, such as a continuous exterior portion, of the vehicle body 101. In this way, the cover 112 can be moveable to at least partially conceal the sensor lens 102 and/or the cleaning assembly 104 from the environment about the vehicle body 101. Put another way, the cover 112 can assist in at least partially, nearly fully and/or fully separating the retractable portion 103 within the chamber 106 from airflow exterior to the chamber 106 and thus also can assist in at least partially covering the sensor lens 102 for cleaning at least partially concealed from an environment about the vehicle body 101.

It will be appreciated that the illustrated cover 112 can be configured, such as being shaped, to align with a contour of the vehicle body 101 defining the opening 142. In one or more other embodiments, the cover 112 can have any other suitable shape.

Also as illustrated, the vehicle body 101, and specifically the roof portion 130, can be configured with a lip portion 205 for being disposed adjacent to and/or engaging with an outer peripheral portion 207 of the cover 112. The lip portion 205 can include a gasket and/or other seal portion (not shown) for engaging the outer peripheral portion 207 of the cover 112, and/or the outer peripheral portion 207 can include a gasket and/or other sealing portion (not shown) for engaging the lip portion 205. The cover 112 can extend at least partially outwardly from an outer periphery of the sensor housing 202, such as extending fully circumferentially outwardly from the outer periphery of the sensor housing 202 as illustrated. In one or more embodiments, the lip 108 of the chamber housing 110 can be mated directly and/or indirectly against the lip portion 205 to provide a seal between the vehicle body 101 and the chamber housing 110.

To facilitate the movement of the sensor lens 102 relative to the chamber 106 and chamber housing 110, the chamber housing 110 and sensor housing 202 include a cooperating support system. For example, the chamber housing 110 can include one or more supports 206. As shown, the chamber housing 110 includes four supports 206 including one support 206 at each lateral side of the chamber housing 110 and two supports 206 at the rear of the chamber housing 110. As used herein, rear and forward designations are made with reference to typical forward and rear designations of a vehicle. In one or more other embodiments, a different arrangement and/or a different number of supports 206 can be included.

The supports 206 can serve as guides for corresponding carriages 204 disposed at the sensor housing 202. That is, a support 206 can be received into a through-passage in a carriage 204. When the sensor lens 102, and thus the sensor module 200, is moved, the carriages 204 riding on the supports 206 can guide and/or support movement of the sensor module 200 relative to the chamber 106. To align with the supports 206, four carriages 204 are illustrated including one carriage 204 at each lateral side of the sensor housing 202 and two carriages 204 at the rear of the sensor housing 202. In other embodiments, a different arrangement and/or a different number of carriages 204 can be included, where suitable relative to the supports 206.

Additionally and/or alternatively, a different support system including differently engaging and/or shaped elements can be included in one or more other embodiments.

A prime mover guide 210 also can be included at the chamber housing 110. As shown, the prime mover guide 210 can be disposed at the rear of the chamber housing 110. The prime mover guide 210 can include any aspect for coupling to the sensor module 200 and for assisting in moving the sensor module 200 into and out of the chamber 106.

As shown, the illustrated prime mover guide 210 includes a moveable member 212 that engages with and moves along a movement member 214. The moveable member 212 and the movement member 214 can have corresponding keys/slots, tabs and/or the like to allow for ratcheting and/or other movement of the moveable member 212 along the movement member 214. The sensor module 200 can couple to the prime mover guide 210, such as to the moveable member 212, by any suitable method, such as by a fastener.

In one or more other embodiments, the prime mover guide 210 can include a worm screw and nut and/or screw guide, ball screw and nut and/or screw guide, worm gear and/or rack and pinion.

Figure 3A:
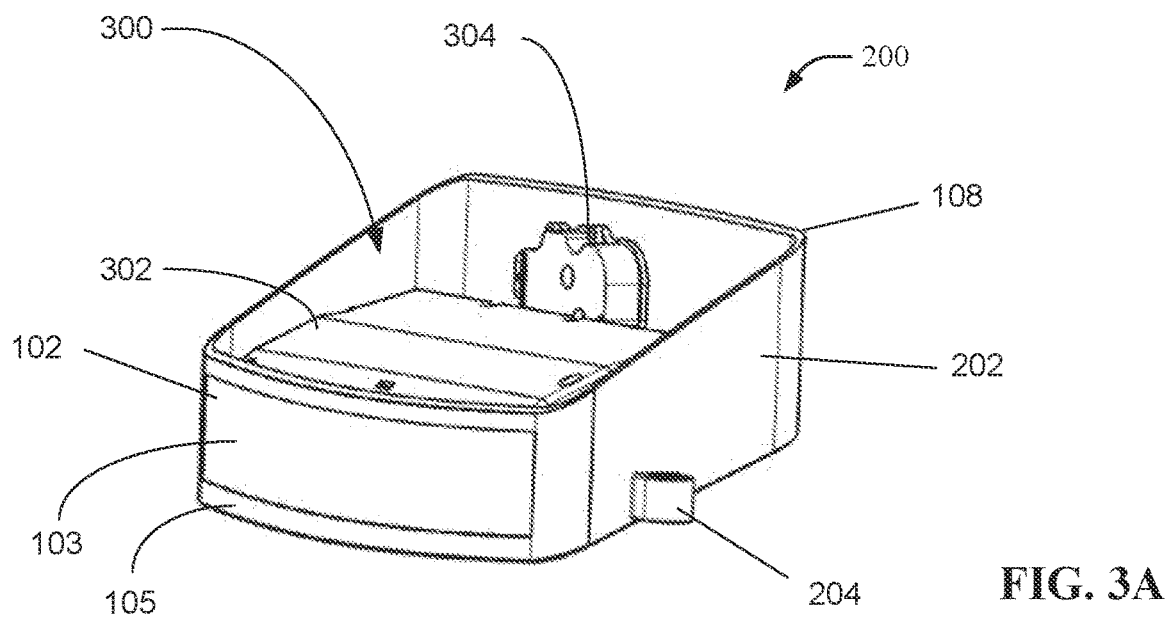
FIG. 3A illustrates a front orthogonal view of the sensor module of FIG. 1A with a cover of the sensor module removed, in accordance with one or more embodiments described herein.

Turning next to FIG. 3A, illustrated is the sensor module 200 with the cover 112 removed. It will be appreciated that the cover 112 can be removed to allow for servicing of one or more component within the sensor housing 202. It also will be appreciated that the sensor module 200 can be fully removed from the chamber 106 to allow for servicing the sensor module 200 separate from the vehicle and/or vehicle body 101.

Indeed, this construction of the sensor system 100 can lend to improved (e.g., optimized and/or enhanced) serviceability of the sensor system 100. For example, the sensor module 200, such as including a sensor 302 and/or sensor lens 102, can be removed from the chamber 106 for servicing, such as absent complete removal of the entire sensor system 100 (e.g., where also including the chamber housing 110, cleaning assembly 104 and/or fluid management system 600, to be described below). This removability can facilitate servicing of the sensor module 200 away from the vehicle and/or easy replacement and/or swapping out of a sensor module 200 and/or sensor 302.

Figure 3B:
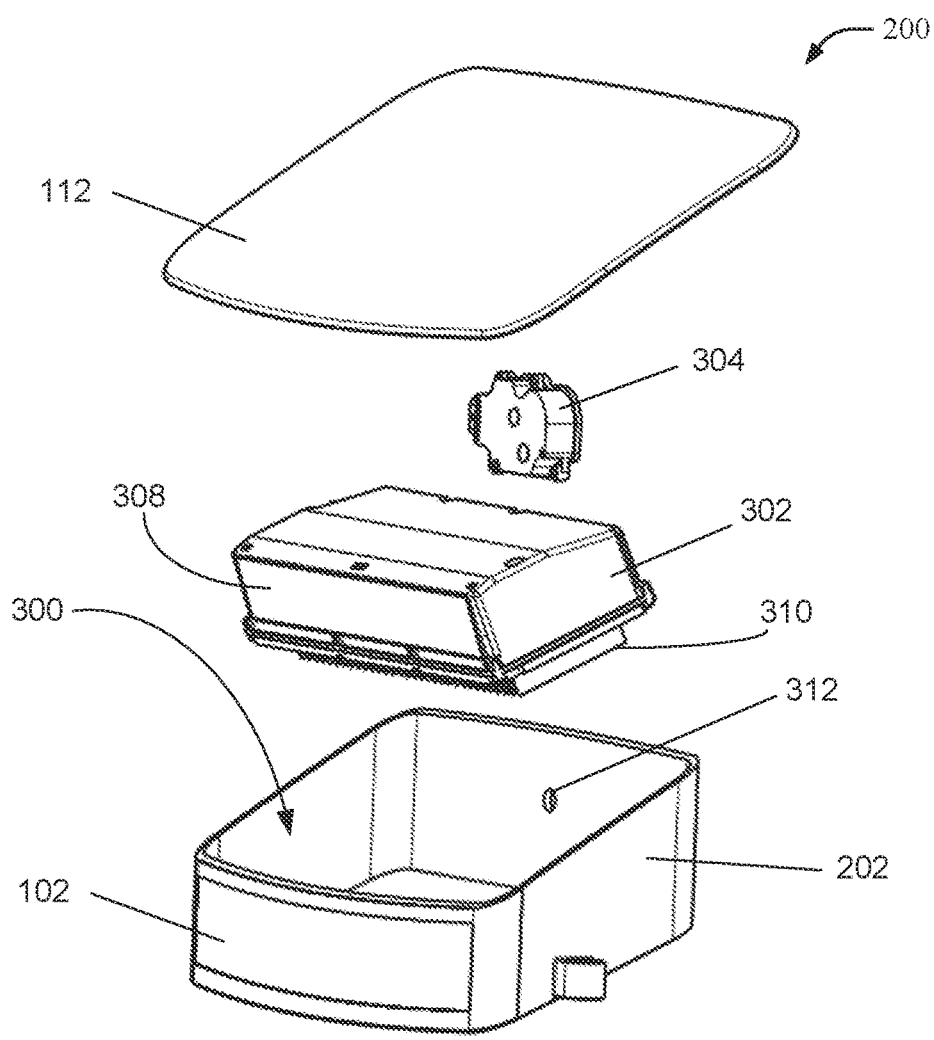
FIG. 3B illustrates a front orthogonal exploded view of the sensor module of FIG. 1A, in accordance with one or more embodiments described herein.

As shown at both FIGS. 3A and 3B, the sensor housing 202 can define a sensor chamber 300 for receiving and containing at least the sensor 302 and or the prime mover 304. That is, as illustrated, the sensor 302 can be moveable with the sensor lens 102 relative to the chamber housing 110 and the chamber 106. As previously indicated, the sensor 302 can include any one or more of visual, thermal, biosignature, electrical signature, light and/or chemical sensors, lidar, radar, sonar and/or any other sensor. The prime mover 304 can be any suitable mechanism for moving the sensor module 200 relative to the chamber housing 110. As shown, the prime mover 304 can be a stepper motor. Although not particularly shown, one or more electrical and or communicative wired and/or wireless connections can be provided for connecting the sensor 302 and/or the prime mover 304 to a computer and/or processing unit, as will be discussed below with reference to FIG. 7.

FIG. 3B particularly illustrates an exploded view of the sensor module 200. As illustrated, the sensor 302 can include a sensor face 308. When the sensor 302 is seated in the sensor housing 202, the sensor face 308 can be disposed adjacent the sensor lens 102.

One or more heat sinks 310 can be disposed at the sensor module 200, such as at the sensor housing 202. As shown, a heat sink 310 is disposed at an internal side and/or underside of the sensor housing 202, such as for assisting with dissipation of heat produced by the sensor 302.

An orifice 312 can be provided in the sensor housing 202 for enabling suitable coupling of the prime mover 304 with the chamber housing 110, such as with the prime mover guide 210 and/or moveable member 212.

Figure 4:
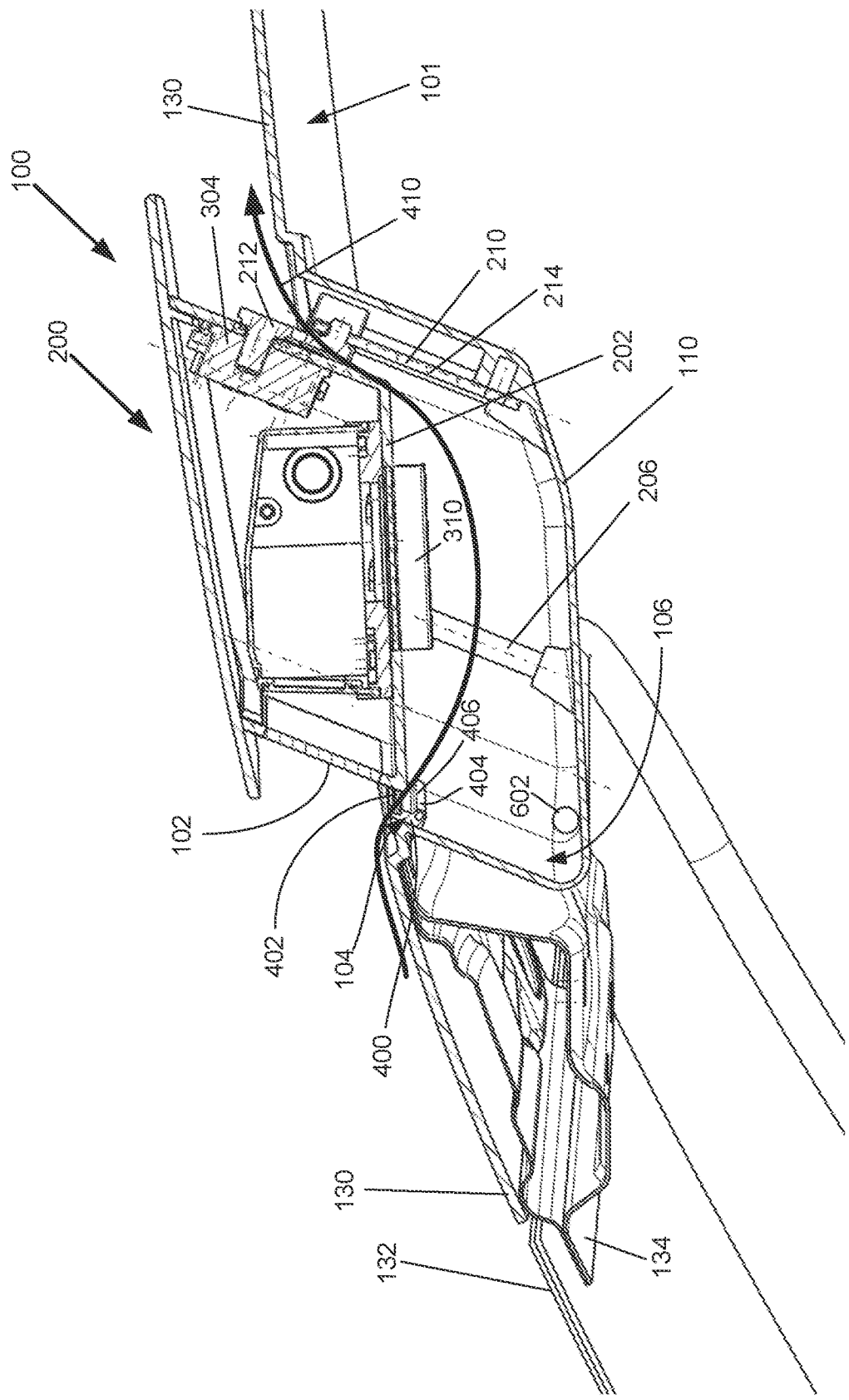
FIG. 4 illustrates a cross-sectioned side view of the sensor system as shown in FIG. 1A and taken along line X-X of FIG. 1A, in accordance with one or more embodiments described herein.
Figure 5A:
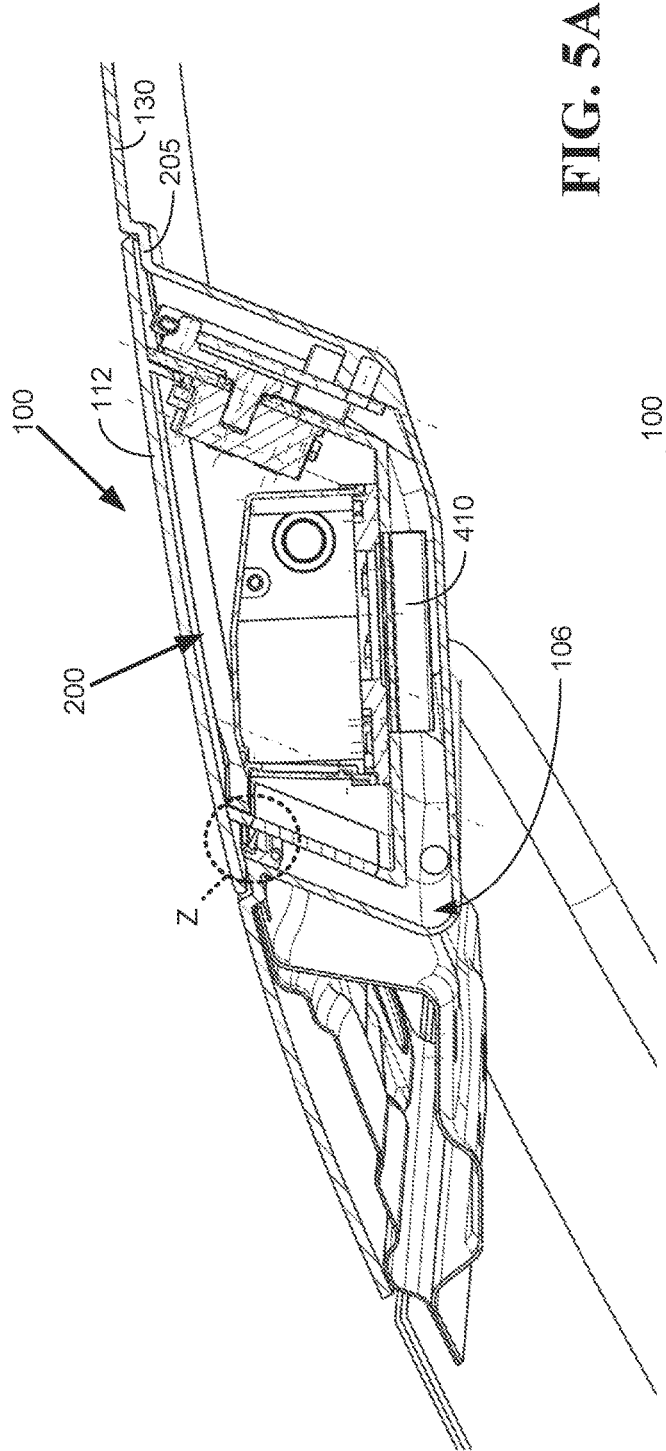
FIG. 5A illustrates a cross-sectioned side view of the sensor system as shown in FIG. 1B and taken along the line Y-Y of FIG. 1B, in accordance with one or more embodiments described herein.

Looking now to FIGS. 4 and 5A, the chamber housing 110 and the sensor module 200 are illustrated as being jointly configured to provide translation, such as linear translation, of the sensor module 200 relative to the chamber housing 110.

At FIG. 4, the sensor module 200 is depicted in a deployed position at least partially moved out of the chamber 106. The deployed position of the sensor module 200 can allow for use of the sensor lens 102 and sensor 302. That is, as shown at FIG. 4, the sensor housing 202, and thus also the sensor lens 102, can be at least partially retractable/deployable relative to the vehicle body 101 to thereby enable movement of the sensor lens 102.

Also illustrated at FIG. 4, the heat sink 310 can be at least partially cooled and/or vented employing the retractability of the sensor system. That is, in that the sensor system 100, and particularly the sensor 302, can produce heat during use and/or can be exposed to a hot environment and/or to direct and/or indirect sunlight, it can be helpful that the retractability of the sensor system 100 can be utilized to cool the sensor system 100. The heat sink 310 can be at least partially exposed to an environment and/or airflow external to the vehicle body 101 and/or the chamber 106 by a partial or full deployment of the sensor lens 102 from the chamber 106. For example, the sensor lens 102 can be only partially deployed from the chamber 106 and/or the cover 112 can be only partially closed relative to the vehicle body 101 to allow for airflow 410 into and out of the chamber 106, such as about the sensor module 200 and/or about the heat sink 310. In one or more embodiments, this partially retracted position of the sensor lens and/or partially closed position of the cover 112 can produce a venturi effect that can draw air into the chamber 106.

At FIG. 5A, the sensor module 200 is depicted in a retracted position at least partially moved into the chamber 106. Indeed, as shown at FIG. 5A, the sensor lens 102 can be fully retained in the chamber in the illustrated position of the sensor module 200. The retracted position of the sensor module 200 can allow for one or more of cleaning and/or stowing of the sensor lens 102.

Indeed, moving, the sensor lens 102 between the retracted position at FIG. 5A (and/or a differently and/or partially retracted position) and the deployed position at FIG. 4 can enable passive cleaning of the sensor lens 102 by the cleaning assembly 104. This is because a wiper 402 of the cleaning assembly 104 can be configured to be engaged by the sensor lens 102 to thereby wipe the sensor lens 102.

When wiping of the sensor lens 102, such as by one or more back and forth movements (e.g., movements into and out of the chamber 106) of the sensor lens 102 is not sufficient to clean the sensor lens 102, the cleaning assembly 104 can provide one or more additional functions.

Figure 5B:
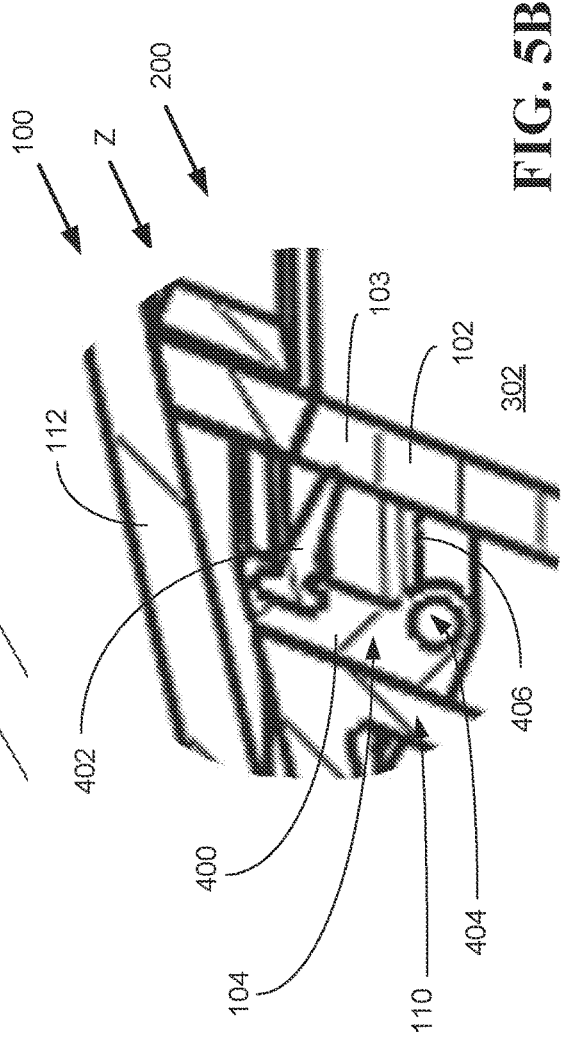
FIG. 5B illustrates an enlarged partial view Z of sensor system as taken from the cross-sectioned side view of FIG. 5A, in accordance with one or more embodiments described herein.
Figure 6A:
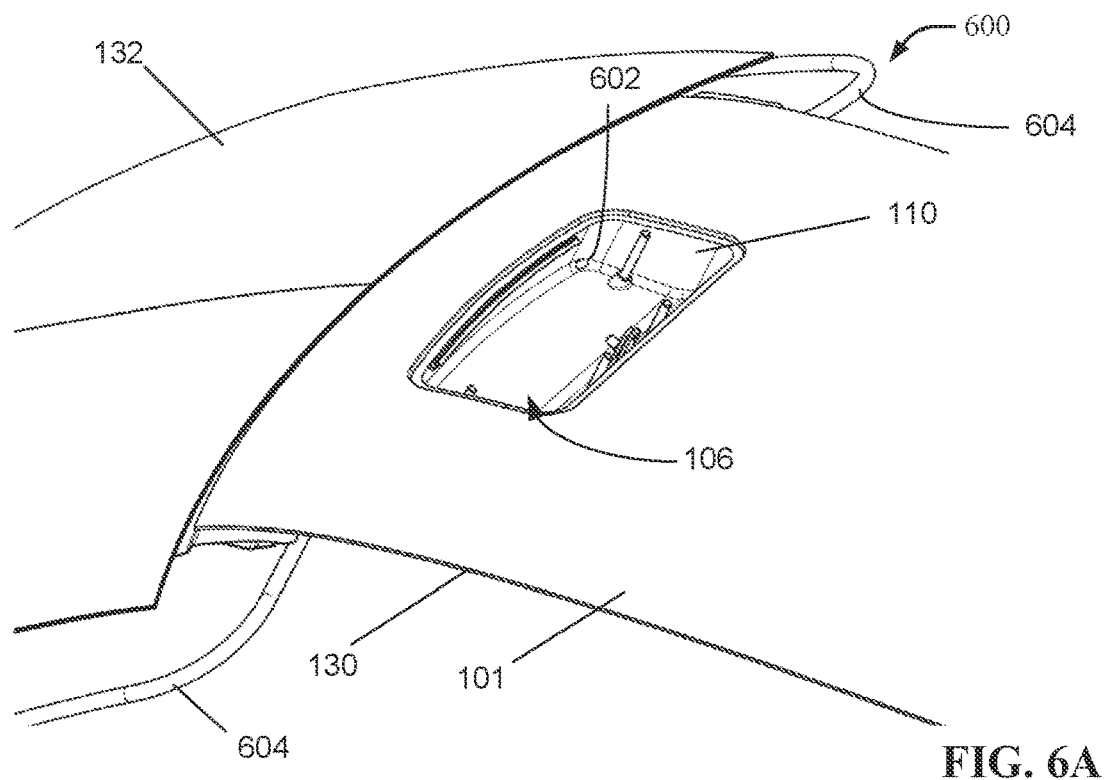
FIG. 6A illustrates a top orthogonal view of the vehicle body as shown at FIG. 2, with the sensor module removed from the illustration, in accordance with one or more embodiments described herein.
Figure 6B:
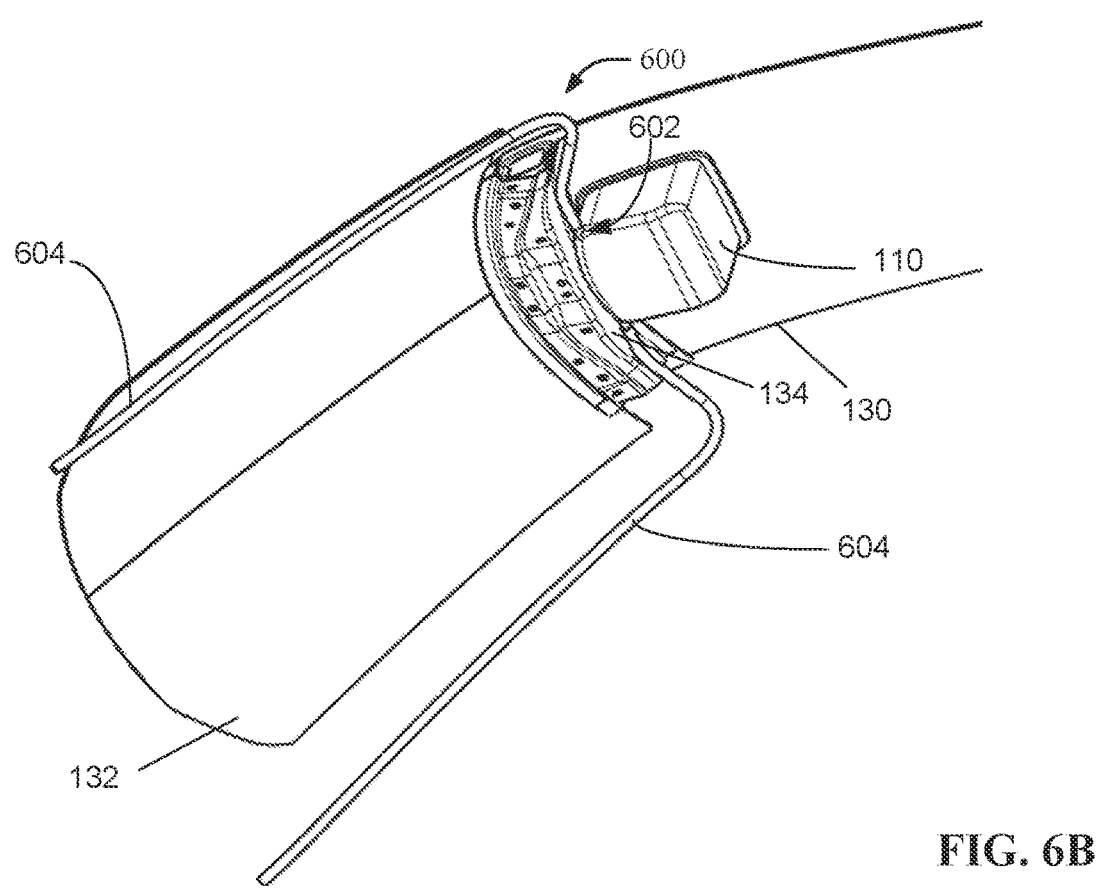
FIG. 6B illustrates an orthogonal underside view of at least a portion of the vehicle body as shown at FIG. 2, in accordance with one or more embodiments described herein.

Turning now to FIGS. 6A and 6B, in addition still to FIGS. 4, 5A and 5B, the cleaning assembly 104 and a fluid management system 600 are illustrated and usage thereof is described.

The cleaning assembly 104 generally can include a passive wiper and a fluid-expelling nozzle. More particularly, as illustrated, the cleaning assembly can include the wiper 402 and a spray element 404 retained at a retaining body 400. The retaining body 400 can be coupled to the chamber housing 110 and/or to the vehicle body 101 by any suitable method, such as, but not limited to, fasteners, adhesive and/or another mechanical and/or chemical method. That is, the cleaning assembly 104 can be fixable relative to the vehicle body 101, and also relative to movement of the sensor lens 102.

The wiper 402 can have any suitable shape and/or comprise any suitable material for engaging with and wiping against the sensor lens 102. In one embodiment, the wiper 402 can be flexible. Additionally and/or alternatively, the wiper 402 can be biased, such as spring-biased, towards the sensor lens 102.

The spray element 404, and thus the cleaning assembly 104, can include a nozzle having a nozzle opening 406 for expelling a fluid at least partially within the chamber 106 to wet and/or clean the sensor lens 102. As shown, the illustrated spray element 404 can include a plurality of nozzles and/or nozzle openings 406 configured, such as positioned, to extend along the sensor lens 102.

The spray element 404 can be fluidly connected to a fluid reservoir (not shown), such as for air, cleaning liquid and/or other fluid (e.g., gas, liquid and/or combination thereof). The spray element 404 can include a pump or other element for drawing from the fluid reservoir.

The cleaning assembly 104, and thus the nozzle openings 406 of the fluid-expelling nozzles, is disposed adjacent to but inside an opening of the chamber 106. In this way, and/or via assistance from location of the cover 112, fluid expelled by the cleaning assembly 104 can be at least partially separable from airflow exterior to the chamber 106 and/or an environment about the vehicle body 101. In one or more other embodiments, the fluid expelled by the cleaning assembly 104 can be nearly fully and/or fully separable from airflow exterior to the chamber 106 and/or an environment about the vehicle body 101. This separation can minimize and/or prevent overspray by the cleaning assembly 104 to one or more other locations at the vehicle and/or vehicle body 101.

Indeed, to clean the sensor lens 102, the sensor system 100 can at least partially retract the sensor lens 102, such as via the prime mover 304, into the chamber 106. It is noted that a portion of the retractable portion 103 of the sensor lens 102 within the chamber 106 can be cleaned if the retractable portion 103 is partially or fully within the chamber 106, and thus if the sensor lens 102 is partially or fully within the chamber 106, and/or if the cover 112 is partially or fully closed relative to the vehicle body 101.

The cleaning assembly 104 can expel a fluid at least partially within the chamber 106, such as when the sensor lens 102 is moving or is stationary. One or more movements of the sensor lens 102 at least partially into and/or out of the chamber 106 can provide for wiping of the sensor lens 102 by the cleaning assembly 104, such as by the wiper 402. In one or more embodiments, a pressure of a fluid expelled at one or more nozzle openings 406 can remove debris or other obscuring elements from the sensor lens 102 with or without the wiping function.

Self-cleaning of at least the sensor lens 102 by the sensor system 100 thus can be provided by the cleaning assembly 104. The self-cleaning can enable the sensor system 100 to be utilized for longer use periods and/or to have greater availability even in less than optimal and/or less than desirable environmental and/or road conditions. That is, the sensor system 100 can enable temporary and/or intermittent cleaning of at least the sensor lens 102 to allow for continued use of the sensor system 100 during one or more user periods.

Providing cleaning of the sensor lens 102 when at least partially concealed by the cover 112 from an environment about the vehicle body 101, and/or when at least partially separated from airflow exterior to the chamber 106, can enable enhanced cleaning of the sensor lens 102. That is, where the cleaning assembly includes the use of a fluid, the at least partial, nearly full and/or full the at least partial, nearly full and/or full concealing, covering and/or positioning of the sensor lens relative to external airflow and/or environmental conditions can minimize and/or prevent fluid from the cleaning assembly and/or removed debris from instead moving to another visible portion of the vehicle and/or vehicle body. For example, such fluid and/or debris can be minimized and/or prevented from instead being moved, such as out of the chamber 106, and subsequently deposited on a viewing panel and/or actuating a rain sensor at the respective vehicle.

To account for the fluid expelled by the cleaning assembly 104, debris removed from the sensor lens 102 and/or moisture that can enter the chamber 106, the sensor system 100 can include a fluid management system 600. The fluid management system 600 generally can direct such fluid, debris and/or moisture away from one or more aspects of the vehicle, such as away from one or more viewing panels, rain sensors and/or occupants. Directing fluid and/or debris away from a viewing panel can aid in keeping a rain sensor at the viewing panel from being triggered merely by the cleaning assembly 104 of the sensor system 100.

The illustrated fluid management system 600 can include one or more drain hoses 604 extending from one or more drain orifices 602 at the chamber housing 110. The drain orifices 602 can extend through the chamber housing 110 and can enable the drain hoses 604 to connect to the chamber 106. The drain hoses 604 can be directed towards a base supporting the vehicle, such as towards the ground, street, highway, road, parking lot, body of water and/or other support base. As illustrated, the drain hoses 604 can be at least partially supported by the windshield support 134 and/or an A-pillar of the vehicle body 101.

It will be appreciated that the cover 112 can be less than fully closed and/or the sensor lens 102 less than fully retracted to enable functionality of the fluid management system 600. In one or more embodiments, the fluid management system 600 can include a suction and/or pump element to aid in directing fluid and/or debris from the chamber 106 and/or through the one or more drain hoses 604. Additionally and/or alternatively, any suitable number drain orifices 602/drain hoses 604 can be included. Additionally and/or alternatively, any one or more drain hoses 604 can direct fluid in a different direction and/or to a different location than one or more other drain hoses 604.

Turning now to one or more additional aspects of the sensor system 100, it will be appreciated that in one or more other embodiments, the sensor system 100 can be configured to angle or otherwise move the sensor module 200 differently from movement including only linear translation. Likewise, the sensor system 100 can be configured for angled, downward, sideways and/or upward movement, and/or any combination thereof, relative to a support base of the vehicle. Indeed, the sensor system 100 can be configured for use at a vehicle side surface, and thus extending out from the side surface, and/or for use at a vehicle bottom surface, and thus extending downwardly from the bottom surface.

Alternatively and/or additionally, in one or more embodiments, the cover 112 can be coupled to the vehicle body 101 instead of and/or in addition to the sensor housing 202. For example, the cover 112 can be hinged to the vehicle body 101 and thus raised via movement of the sensor lens 102 and/or sensor housing 202.

Figure 7:
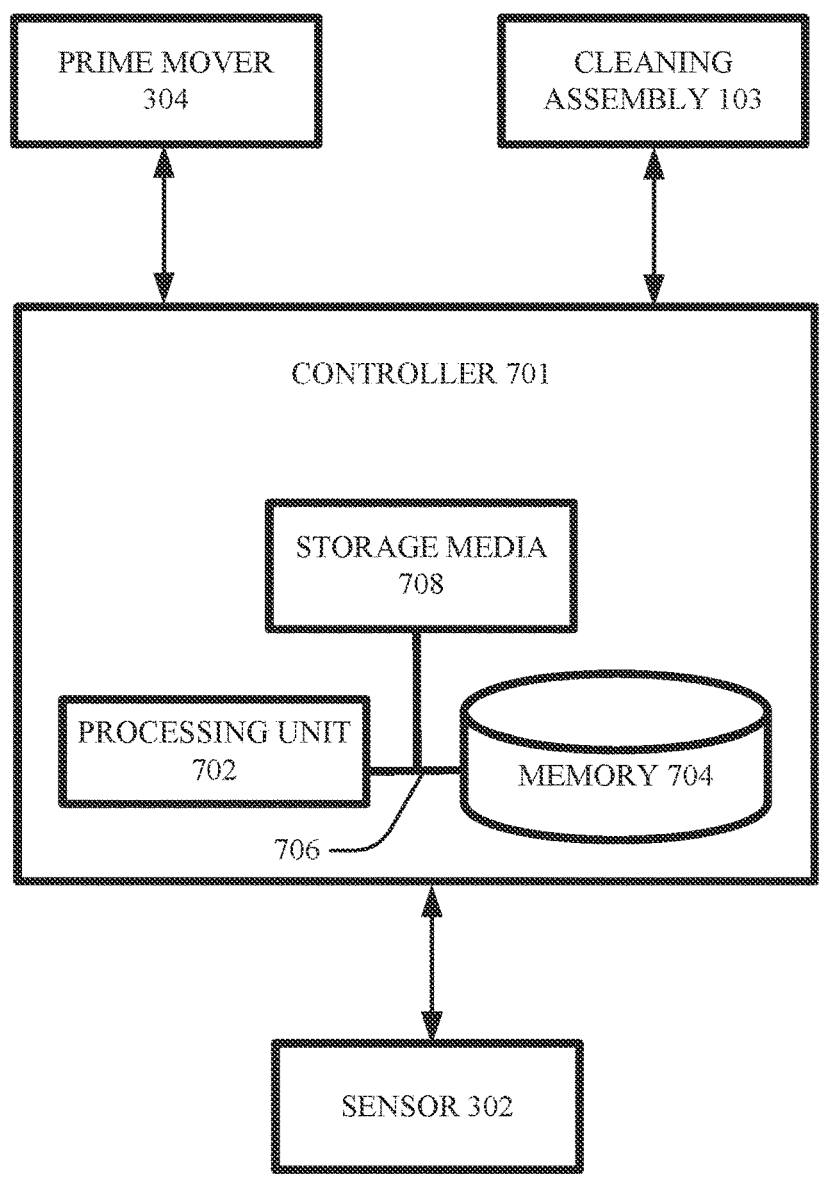
FIG. 7 illustrates a block diagram of one or more aspects of the sensor system illustrated at any of FIGS. 1A-6B, in accordance with one or more embodiments described herein.

Referring now to FIG. 7, it will be appreciated that in one or more embodiments, the sensor system 100 can include a controller 710 which can include one or more of a processing unit 702, memory 704 and/or bus 706. The bus 706 can couple system components including, but not limited to, the system memory 704 to the processing unit 702 and/or the sensor 302 and/or prime mover 304 to the processing unit 702. The processing unit 702 can be any of various available processors. One or more dual microprocessors and/or other multiprocessor architectures can be employed at and/or as the processing unit 702.

The bus 706 can include any one or more of various types of bus structure(s) including a memory bus, memory controller, peripheral bus, external bus and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094) and/or Small Computer Systems Interface (SCSI).

The system memory 704 can include volatile memory and/or nonvolatile memory. A basic input/output system (BIOS), containing one or more basic routines to transfer information between elements within the sensor system 100, such as during activation of the sensor system 100, can be stored in a nonvolatile memory. By way of illustration, and not limited thereto, nonvolatile memory can include read only memory (ROM), programmable ROM (PROM), electrically programmable ROM (EPROM), electrically erasable programmable ROM (EEPROM), flash memory and/or nonvolatile random-access memory (RAM) (e.g., ferroelectric RAM (FeRAM)). Volatile memory can include random access memory (RAM), which can act as external cache memory. By way of illustration, and not limited thereto, RAM can be available in any one or more forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM.

In one or more embodiments, the sensor system 100 can include removable and/or non-removable, volatile and/or non-volatile computer storage media 708, such as a disk storage, which can be connected to the bus 706. A disk storage can include, but is not limited to, a device such as a magnetic disk drive, floppy disk drive, tape drive, Zip drive, LS-100 drive, flash memory card, memory stick, optical disk drive such as for a compact disk ROM device (CD-ROM), CD recordable drive (CD-R Drive), CD rewritable drive (CD-RW Drive) and/or digital versatile disk ROM drive (DVD-ROM).

The sensor system 100 can operate in a networked environment, such as a cloud network, using logical connections to one or more remote computers, such as remote computer(s). The remote computer(s) can include a computer, server, router, network PC, workstation, microprocessor-based appliance, peer device and/or other common network node and/or the like.

The controller 701 can perform one or more functions for facilitating performance of one or more computer-readable instructions. In one or more embodiments, the controller 701 can activate and/or deactivate the sensor system 100 and/or the sensor 302. In one or more embodiments, the controller can deploy and/or retract the sensor lens 102, such as via communicative connection to the primer mover 304. In one or more embodiments, the controller 701 can open or close the cover 112 if this is separately facilitated, such as via operation of a cover prime mover. The controller 701 can perform a venting cycle to at least partially raise the cover 112 relative to the chamber housing 110, such as via operation of the prime mover 304.

In one or more embodiments, the controller 701 can determine that the sensor lens 102 is obscured, partially obscured and/or obscured to a threshold, such as at an instant and/or over a determined period of time. The length of the period of time and/or the threshold of how much of the sensor lens 102 is obscured can be selectively determined by the controller and/or administrative entity, and/or can be determined via artificial intelligence related to the environmental weather and/or lighting conditions disposed about the sensor 200, for example. In one or more embodiments, the controller 701, such as the processing unit 702, can employ distributed and/or federated machine intelligence, which can be employed to operate and/or facilitate one or more of the aforementioned computer-readable program instructions, such as the determination of obscuring of the sensor lens 102.

The controller 701 can perform operation of a cleaning cycle including one or more operations of the cleaning assembly 104 and/or prime mover 304 in response to such determination. Operation of the cleaning assembly 104 by the controller 701 can include expelling a fluid, such as cleaning fluid. During a cleaning cycle, the cleaning assembly 104 and/or the prime mover 304 can be operated sequentially, such as where the sensor lens 102 is retracted, the cleaning assembly 104 is activated to expel cleaning fluid, the sensor lens 102 is deployed to run across the wiper 402, and then this cycle is repeated one or more additional times. Repeating of the cleaning cycle can be performed by the controller 701 based upon one or more additional determinations and or differences in a level of cleanliness and/or level of being obscured of the sensor lens 102. For example, the controller 701 can update a visibility status of the sensor lens 102.

Figure 8:
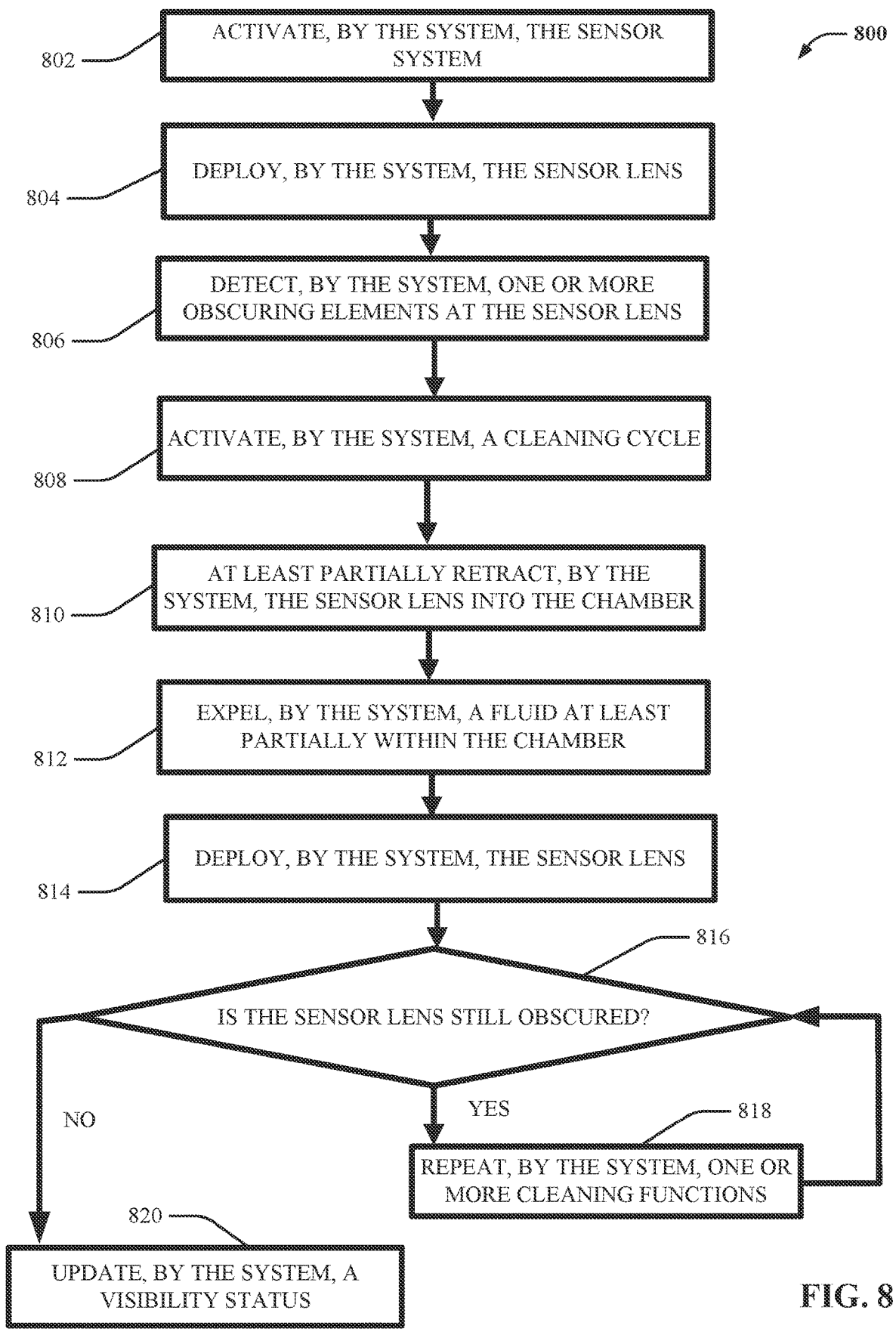
FIG. 8 illustrates a flow diagram of an example, non-limiting system-implemented method that can facilitate movement and/or cleaning of a sensor lens of the sensor system, in accordance with one or more embodiments described herein.

Turning now to FIG. 8, illustrated is a flow diagram of an example, non-limiting system-implemented method 800 that can facilitate movement and/or cleaning of a sensor lens of a sensor system, in accordance with one or more embodiments described herein. Repetitive description of like elements employed in one or more other embodiments described herein is omitted for sake of brevity.

At 802, the system-implemented method 800 can comprise activating, by a sensor system (e.g., via controller 701 of the sensor system 100), the sensor system (e.g., sensor system 100).

At 804, the system-implemented method 800 can comprise deploying, by the sensor system (e.g., via prime mover 304 and/or controller 701), the sensor lens (e.g., sensor lens 102) from the chamber (e.g., chamber 106).

At 806, the system-implemented method 800 can comprise detecting, by the sensor system (e.g., via controller 701), one or more obscuring elements at the sensor lens (e.g., sensor lens 102).

At 808, the system-implemented method 800 can comprise activating, by the sensor system (e.g., via the controller 701 and/or cleaning assembly 104), a cleaning cycle.

At 810, the system-implemented method 800 can comprise at least partially retracting, by the sensor system (e.g., via controller 701 and/or prime mover 304), the sensor lens (e.g., sensor lens 102) into the chamber (e.g., chamber 106).

At 812, the system-implemented method 800 can comprise expelling, by the sensor system (e.g., via controller 701, cleaning assembly 104 and/or spray element 404), a fluid at least partially within the chamber (e.g., chamber 106).

At 814, the system-implemented method 800 can comprise deploying, by the sensor system (e.g., via controller 701 and/or prime mover 304), the sensor lens (e.g., sensor lens 102) from the chamber (e.g., chamber 106).

At 816, the system-implemented method 800 can comprise determining, by the sensor system (e.g., via controller 701), whether or not the sensor lens (e.g., sensor lens 102) is still obscured.

Where the answer is yes, at block 818, the system-implemented method 800 can comprise repeating, by the sensor system (e.g., via controller 701, prime mover 304 and/or cleaning assembly 104), one or more cleaning functions (e.g., one or more of the steps described at blocks 810, 812 and 814.) The method can then turn again to the determination block 816.

Where the answer is no, at block 820, the system-implemented method 800 can comprise updating, by the sensor system (e.g., via controller 701), a visibility status of the sensor system (e.g., sensor system 100 and/or sensor 302).

Figure 9:
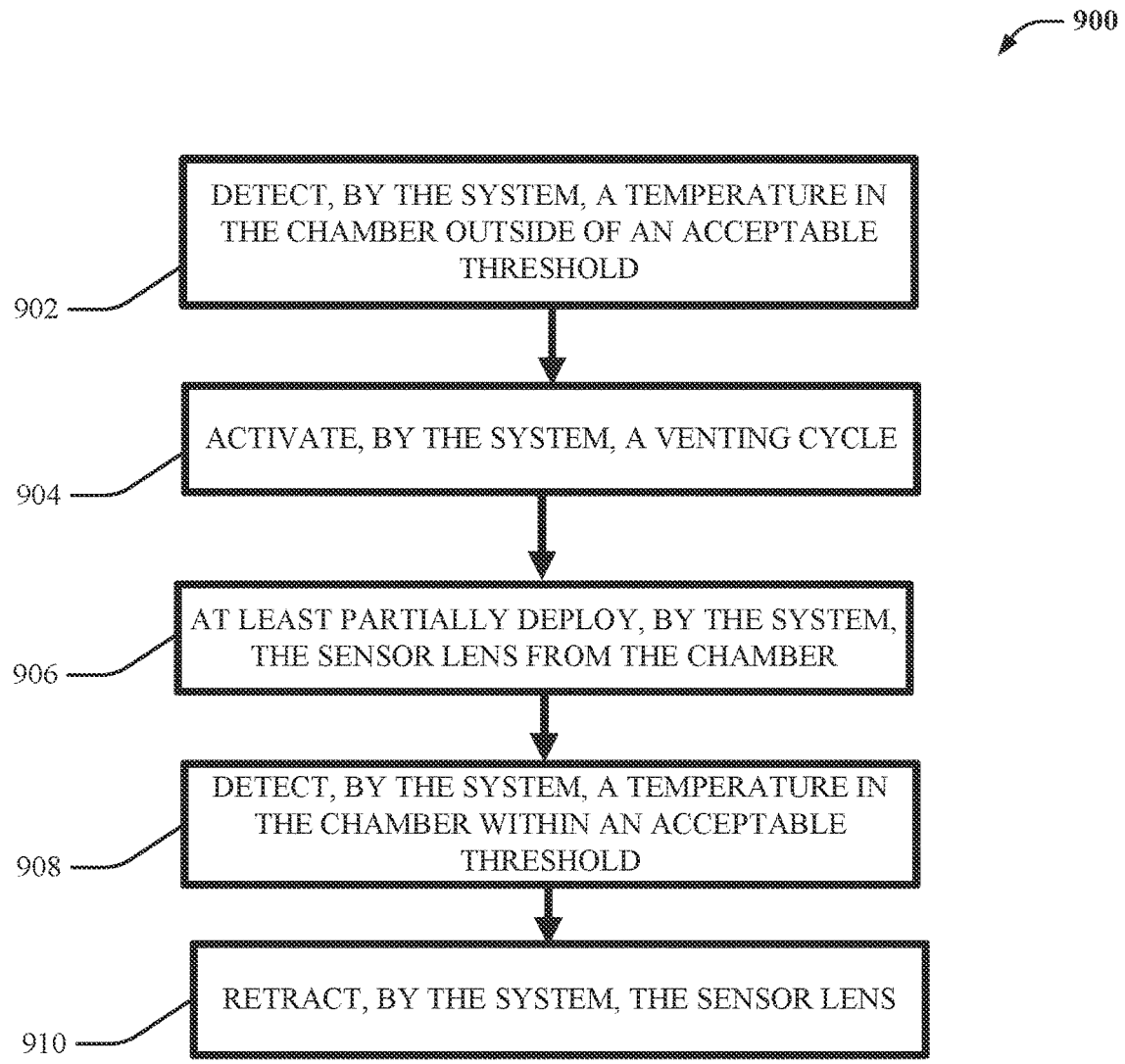
FIG. 9 illustrates a flow diagram of an example, non-limiting system-implemented method that can facilitate movement and/or venting of a sensor system, in accordance with one or more embodiments described herein.

Turning now to FIG. 9, illustrated is a flow diagram of an example, non-limiting system-implemented method 800 that can facilitate movement and/or venting of a sensor system, in accordance with one or more embodiments described herein. Repetitive description of like elements employed in one or more other embodiments described herein is omitted for sake of brevity.

At 902, the system-implemented method 900 can comprise detecting, by a sensor system (e.g., via controller 701 of sensor system 100), a temperature in the chamber (e g, chamber 106) outside of an acceptable threshold.

At 904, the system-implemented method 900 can comprise activating, by the sensor system (e.g., via controller 701 and/or prime mover 304), a venting cycle.

At 906, the system-implemented method 900 can comprise at least partially deploying, by the sensor system (e.g., via controller 701 and/or prime mover 304), the sensor lens (e.g., sensor lens 102) from the chamber (e.g., chamber 106).

At 908, the system-implemented method 900 can comprise detecting, by the sensor system (e.g., via controller 701), a temperature in the chamber (e.g., chamber 106) within an acceptable threshold.

At 910, the system-implemented method 900 can comprise retracting, by the sensor system (e.g., via controller 701 and/or prime mover 304), the sensor lens (e.g., sensor lens 102) into the chamber (e.g., chamber 106).

Figure 10:
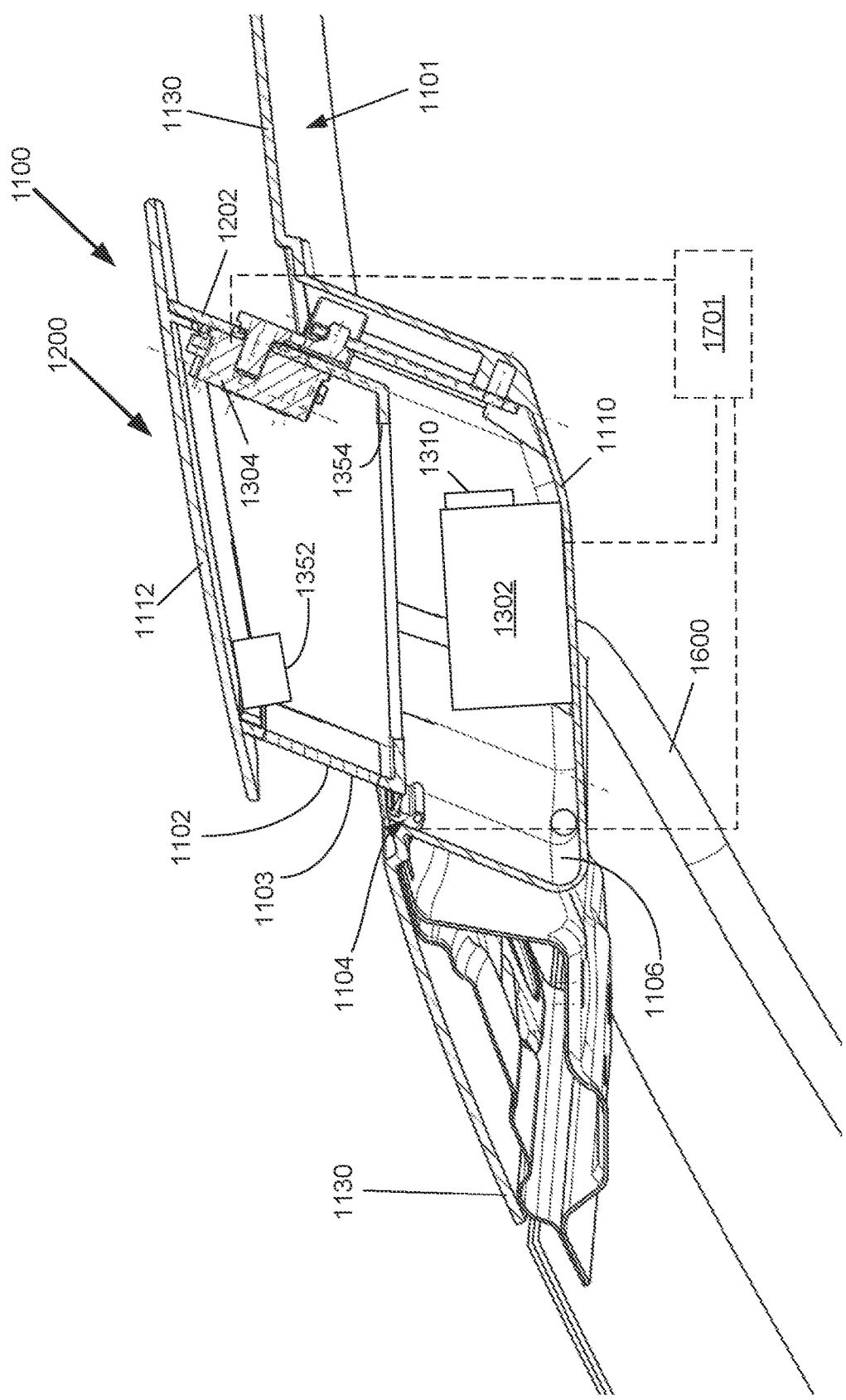
FIG. 10 illustrates a cross-sectioned side view of another sensor system, for a vehicle body, that can facilitate movement and/or cleaning of a sensor lens of the sensor system.

Looking next to FIG. 10, another exemplary embodiment of a sensor system is illustrated at 1100. The sensor system 1100 is substantially similar to the sensor system 100, except as described below. Elements of this sensor system 1100 that are similar to the sensor system 100 are identified by like reference numerals but offset by 1000. One or more elements of the sensor system 100 can be used with the sensor system 1100 or vice versa, where suitable.

FIG. 10 illustrates at least a sensor system 1100 disposed at a vehicle body 1101 of a vehicle. The sensor system 1100 can include at least a sensor lens 1102, a cleaning assembly 1104 and/or a controller 1701.

The sensor lens 1102 can have a retractable portion 1103 that is moveable at least partially into and out of a chamber 1106. That is, the sensor lens 1102, and specifically the retractable portion 1103, can be moveable between a retracted position (now shown) within the chamber 1106 and a deployed position out of the chamber, as shown at FIG. 10.

The cleaning assembly 1104 can be configured to clean the retractable portion 1103 of the sensor lens 1102 disposed within the chamber 1106 and at least partially separated from airflow exterior to the chamber 1106. That is, when the retractable portion 1103 (e.g., all or a sub-portion thereof) is disposed within the chamber 1106, the cleaning assembly 1104 can clean the retractable portion 1103 (e.g., all or the sub-portion thereof within the chamber 1106). In the retracted position of the retractable portion (not shown), the retractable portion 1103 can be at least partially, nearly fully and/or fully separated from airflow exterior to the chamber 1106, such as airflow moving about the vehicle body 1101.

The controller 1701 can perform one or more functions relative to the cleaning assembly 1104, such as those described above with respect to the embodiment of FIGS. 1-9.

Looking still to FIG. 10, in the same or another embodiment, the sensor system 1100 for a vehicle body 1101 can include the moveable sensor lens 1102, a cover 1112 and the cleaning assembly 1104. The cleaning assembly 1104 can be configured to clean the sensor lens 1102 at least partially concealed by the cover 1112 from an environment about the vehicle body 1101. The sensor lens 1102 can be moveable, such as relative to the vehicle body 1101, between the deployed position of the sensor lens 1102 illustrated at FIG. 10 and the retracted position of the sensor lens 1102. The cover 1112 can at least partially cover the sensor lens 1102 to thereby at least partially conceal the sensor lens 1102. A controller 1701 can perform one or more functions relative to the cleaning assembly 1104, such as those described above with respect to the embodiment of FIGS. 1-9.

In view of these aforementioned embodiments, cleaning the sensor lens 1102 when at least partially concealed by the cover 1112 from an environment about the vehicle body 1101, and/or when at least partially separated from airflow exterior to the chamber 1106, can enable enhanced cleaning of the sensor lens 1102. That is, where the cleaning assembly 1014 includes the use of a fluid, the at least partial, nearly full and/or full concealing, covering and/or positioning of the sensor lens 1102 relative to external airflow and/or environmental conditions can minimize and/or prevent fluid from the cleaning assembly 1104 and/or removed debris from instead moving to another visible portion of the vehicle and/or vehicle body 1101. For example, such fluid and/or debris can be minimized and/or prevented from instead being deposited on a viewing panel and/or actuating a rain sensor.

Further, the sensor system 1100, different from the sensor system 100, can include a sensor module 1200 having a sensor housing 1202 for retaining the sensor lens 1102 but not the sensor 1302. That is, the sensor 1302 can be fixed relative to the sensor lens 1102. Instead, the sensor 1302 can be retained in the chamber 1106 of the chamber housing 1110.

When the sensor lens 1102, and also the sensor housing 1202, are moved, such as by the prime mover 1304, an opening 1354 at the sensor housing 1202 can allow for movement of the sensor housing 1202 relative to the sensor 1302 and/or one or more heat sinks 1310. That is, the opening 1354 can be disposed about and peripherally receive the sensor 1302 and/or the one or more heat sinks 1310.

The sensor lens 1102 can have associated therewith one or more transfer elements 1352. The transfer elements 1352 can enable visual, thermal and/or other images and/or signals to be transferred, such as directed, reflected and/or refracted to the sensor 1302. The one or more transfer elements 1352 can include any one or more of, without being limited to, mirrors, reflectors, projectors, refractors, lenses and/or the like.

It will be appreciated that in still another embodiment, the sensor lens 1102 can be moveable separate from any one or more of the sensor housing 1202, cover 1112, sensor 1302 and/or one or more transfer elements 1352.

Turning now to any of the one or more embodiments discussed above with reference to any one or more of FIGS. 1 to 10, in view of the aforementioned descriptions, the one or more embodiments described herein are summarized. The one or more embodiments described herein can provide one or more self-protection, self-cleaning, self-cooling, protection, fluid management, serviceability and/or modularity aspects and/or functions.

For example, by retracting at least partially into the chamber 106, 1106 at the vehicle body 101, 1101, the sensor lens 102, 1102 can be protected from one or more of environmental conditions, objects and/or substances coming off the road and/or from another vehicle. This can be the case such as when the sensor system 100, 1100 is not being utilized or in view of one or more undesirable environmental and/or road conditions. Retractability of one or more aspects of the sensor system 100, 1100 also can provide a desirable aesthetic, such as absent a sensor system 100, 1100 or portion thereof interrupting a contour and/or other design feature of the vehicle.

Self-cleaning of at least the sensor lens 102, 1102 can be provided by the cleaning assembly 104, 1104 of the sensor system 100, 1100. The self-cleaning can enable the sensor system 100, 1100 to be utilized for longer use periods and/or to have greater availability even in less than optimal and/or less than desirable environmental and/or road conditions. That is, the sensor system 100, 1100 can enable temporary and/or intermittent cleaning of at least the sensor lens 102, 1102 to allow for continued use of the sensor system 100, 1100 during one or more user periods.

Providing cleaning of the sensor lens 102, 1102 when at least partially concealed by the cover 112, 1112 from an environment about the vehicle body 101, 1101, and/or when at least partially separated from airflow exterior to the chamber 106, 1106, can enable enhanced cleaning of the sensor lens 102, 1102. That is, where the cleaning assembly 104, 1104 includes the use of a fluid, the at least partial, nearly full and/or full concealing, covering and/or positioning of the sensor lens 102, 1102 relative to external airflow and/or environmental conditions can minimize and/or prevent fluid from the cleaning assembly 104, 1104 and/or removed debris from instead moving to another visible portion of the vehicle and/or vehicle body 101, 1101. For example, such fluid and/or debris can be minimized and/or prevented from instead being deposited on a viewing panel and/or actuating a rain sensor.

Additionally and/or alternatively, where the cleaning assembly 104, 1104 includes the use of a fluid, the fluid management system can reduce and/or altogether prevent such fluid and/or debris removed from the sensor lens 102, 1102 from being directed towards a viewing panel of the vehicle. Directing fluid and/or debris away from a viewing panel can aid in keeping a rain sensor at a viewing panel from being triggered merely by the cleaning assembly 104, 1104.

Furthermore, in that the sensor system 100, 1100 can produce heat during use and/or can be exposed to a hot environment, and/or to direct and/or indirect sunlight, it also is helpful that the retractability of the sensor system 100, 1100 can be utilized to cool the sensor system 100, 1100, such as to cool the sensor 302, 1302. The sensor lens 102, 1102 can be partially deployed to allow for air to pass into the chamber 106, 1106, such as over one or more heat sinks 310, 1310 of the sensor system 100, 1100. In one or more embodiments, this partially retracted position of the sensor lens 102, 1102 can produce a venturi effect that can draw air into the chamber 106, 1106 and about the one or more heat sinks 310, 1310.

Additionally and/or alternatively, one or more of the aforementioned construction aspects of the sensor system 100, 1100 can lend to improved (e.g., optimized and/or enhanced) serviceability of the sensor system 100, 1100. For example, the sensor module 200, 1200 such as including the sensor 302, 1302 and/or sensor lens 102, 1102, can be removed from the chamber 106, 1106 for servicing, such as absent complete removal of the entire sensor system 100, 1100, such as including one or more of the chamber housing 110, 1110, cleaning assembly 104, 1104 and/or fluid management system 600, 1600. This removability can facilitate servicing away from the vehicle and/or easy replacement and/or swapping out of a sensor module 200, 1200 and/or sensor 302, 1302. In one or more embodiments described above, a cover 112, 1112 of the sensor housing 202, 1202 can be removed from the sensor module 200, 1200, with or without removal of the sensor module 200, 1200, to enable access to one or more aspects within the sensor housing 202, 1202.

The removability of the sensor module 200, 1200 and/or construction of the sensor system 100, 1100 further can enable modularity of the sensor system 100, 1100 relative to different vehicles of the same and/or different models and/or types. That is, a same sensor module 200, 1200 and/or chamber housing 110, 1110 can be employed at a different vehicle (e.g., plane, boat and/or drone), different vehicle type (e.g., SUV, hatchback, coupe, sedan and/or convertible) and/or different vehicle model. Indeed a minor configuration to the chamber housing 110, 1110 and/or swapping out of the cover 112, 1112 can enable employment of the sensor system 100, 1100 and/or the sensor module 200, 1200 at any number of vehicles and/or even at different vehicle surfaces and/or locations on a vehicle. As indicated above, the locational use of the sensor system 100, 1100 is not limited to a roof or upper portion of a vehicle. Indeed, the sensor system 100, 1100 can be configured for use at a vehicle side surface, and thus extending out from the side surface, and/or for use at a vehicle bottom surface, and thus extending downwardly from the bottom surface.

The one or more flowcharts and/or block diagrams in the Figures illustrate the architecture, functionality, and operation of one or more possible implementations of one or more systems, apparatuses and/or methods according to various embodiments described herein. In this regard, one or more blocks in the one or more flowcharts and/or block diagrams can represent a module, segment and/or portion of instructions, which can comprise one or more executable instructions for implementing the specified logical function(s). In one or more alternative implementations, one or more functions noted in one or more of the blocks can occur out of the order illustrated in the Figures. For example, one or more blocks shown in succession can be executed substantially concurrently and/or the one or more blocks can be executed in a reverse order as that illustrated, such as depending upon a functionality involved. It also will be noted that one or more blocks of the one or more flowcharts and/or block diagrams, and/or one or more combinations of one or more blocks thereof, can be implemented by a special purpose hardware-based system that can perform one or more of the specified functions and/or can carry out one or more special purpose hardware and/or computer instructions.

As indicated, one or more aspects are described herein with reference to one or more flowchart illustrations and/or block diagrams of one or more methods, apparatuses and/or systems according to one or more embodiments described herein. It will be understood that one or more blocks of the one or more flowcharts and/or block diagrams, and/or one or more combinations of blocks in the one or more flowcharts and/or block diagrams, can be implemented by one or more computer-readable program instructions.

The computer-readable program instructions can be provided to a processor of a general purpose computer, special purpose computer and/or other programmable data processing apparatus to produce a machine. For example, the instructions, which can execute via the processor of the computer and/or other programmable data-processing apparatus, can create one or more means for implementing the one or more functions and/or processes specified in the one or more flowchart and/or block diagram blocks. The computer-readable program instructions can be stored in a computer-readable storage medium that can direct a computer, programmable data processing apparatus and/or other device to function in a particular manner. For example, the computer-readable storage medium having instructions stored therein can comprise an article of manufacture including instructions that can implement one or more aspects of the one or more functions and/or processes specified in the one or more flowchart and/or block diagram blocks. The computer-readable program instructions can be loaded onto a computer, other programmable data processing apparatus and/or other device to cause one or more operational acts to be performed on the computer, other programmable apparatus and/or other device to produce a computer-implemented process. For example, the instructions that can execute on the computer, other programmable apparatus and/or other device can implement the one or more functions and/or processes specified in the one or more flowchart and/or block diagram blocks.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a graphics processing unit (GPU), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. As used herein, terms such as "store," "storage," "data store," data storage," "database," and substantially any other information storage component relevant to operation and functionality of a component are utilized to refer to "memory components," entities embodied in a "memory," or components comprising a memory. A processor can employ distributed and/or federated machine intelligence, which can be employed to operate and/or facilitate one or more of the aforementioned computer-readable program instructions.

It is to be appreciated that memory and/or memory components described herein can be either volatile memory or nonvolatile memory, and/or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described herein includes one or more mere examples of one or more systems and/or methods. It is, of course, not possible to describe every conceivable combination of components and/or system-implemented methods for purposes of describing the subject matter. Nonetheless, one of ordinary skill in the art can recognize that one or more further combinations and/or permutations of the disclosed subject matter are possible. Furthermore, to the extent that the terms "includes", "has", "possesses" and/or the like are used in the detailed description, claims, appendices and/or drawings, such terms are intended to be inclusive in a manner similar to the term "comprising" as "comprising" is interpreted when employed as a transitional word in a claim.

It will be understood that when an element is referred to as being "coupled" to another element, the term "coupled" can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling and/or another type of coupling. As referenced herein, an "entity" can comprise a machine, device, hardware, software, computing device and/or human. It will be appreciated that such entity can facilitate implementation of the subject matter disclosed herein in accordance with one or more embodiments described herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance and/or illustration. For the avoidance of doubt, the subject matter disclosed herein is not limited by such examples. In addition, any aspect and/or design described herein as an "example" and/or "exemplary" is not necessarily to be construed as preferred and/or advantageous over other aspects or designs, nor is it meant to preclude equivalent exemplary structures and/or techniques known to those of ordinary skill in the art.

The description of the one or more various embodiments provided herein has been presented for purposes of illustration but is not intended to be exhaustive and/or limited to the one or more embodiments disclosed. One or more modifications and/or variations will be apparent to those of ordinary skill in the art without departing from the scope and/or spirit of the described embodiments. The terminology used herein was chosen to best explain the principles of the embodiments, practical application and/or technical improvement over technologies found in the marketplace, and/or to enable others of ordinary skill in the art to understand the embodiments disclosed herein.

What is claimed is:

1. A sensor system for a vehicle body, the sensor system comprising:
   a sensor housing comprising:
     a sensor lens,
     at least one sensor, and
     a heat sink attached to an outside surface of the sensor housing, and connected to the at least one sensor,
     wherein the sensor housing is moveable at least partially into and out of a chamber, and wherein the heat sink is not exposed to airflow exterior to the chamber in response to the sensor housing being moved completely into the chamber;
   a cleaning assembly configured to clean the at least a portion of the sensor lens disposed within the chamber and at least partially separated from airflow exterior to the chamber;
   a controller configured to:
     in response to a first determination, via the at least one sensor, that the sensor lens is at least partially obscured by at least a threshold amount, initiate the cleaning assembly to clean the portion of the sensor lens, and
     in response to a second determination, via the at least one sensor, that the heat sink requires cooling, moves the sensor housing at least partially out of the chamber to expose the heat sink to the airflow exterior to the chamber; and
   a fluid management system that directs, via a suction mechanism and one or more drain hoses, fluid expelled by the cleaning assembly away from one or more viewing panels at the vehicle body.

2. The sensor system of claim 1,
   wherein the cleaning assembly is fixable relative to the vehicle body.

3. The sensor system of claim 1,
   wherein the cleaning assembly includes a passive wiper and a fluid-expelling nozzle.

4. The sensor system of claim 3,
   wherein a nozzle opening of the fluid-expelling nozzle is at least partially separable from the airflow.

5. The sensor system of claim 1, wherein the sensor housing further comprises an exterior cover that forms an exterior portion of the vehicle body.

6. The sensor system of claim 1,
   wherein to clean the sensor lens, the cleaning assembly expels the fluid at least partially within the chamber.

7. The sensor system of claim 5, wherein the heat sink is located on an opposite side of the sensor housing from the exterior cover.

8. A vehicle, comprising:
a sensor housing comprising:
  a sensor lens,
  a cover,
  at least one sensor, and
  a heat sink attached to an outside surface of the sensor housing, and connected to the at least one sensor,
  wherein the sensor housing is moveable at least partially into and out of a chamber, and wherein the heat sink is not exposed to airflow exterior to the chamber in response to the sensor housing being moved completely into the chamber;
a cleaning assembly configured to clean the at least a portion of the sensor lens disposed within the chamber and at least partially separated from airflow exterior to the chamber;
a controller configured to:
  in response to a first determination, via the at least one sensor of the sensor system, that the sensor lens is at least partially obscured by at least a threshold amount, initiate the cleaning assembly to clean the portion of the sensor lens, and
  in response to a second determination, via the at least one sensor, that the heat sink requires cooling, moves the sensor housing at least partially out of the chamber to expose the heat sink to the airflow exterior to the chamber; and
a fluid management system that directs, via a pump element and one or more drain hoses, fluid expelled by the cleaning assembly away from one or more viewing panels at a vehicle body of the vehicle.

9. The sensor system of claim 8,
wherein the cover is moveable to form an exterior portion of the vehicle body and to at least partially conceal the cleaning assembly from the environment about the vehicle body.

10. The sensor system of claim 8, wherein the fluid management system is at least partially separated from the environment about the vehicle body.

11. The vehicle of claim 8,
wherein the cleaning assembly is fixable relative to a vehicle body of the vehicle.

12. The vehicle of claim 8,
wherein the cleaning assembly includes a passive wiper and a fluid-expelling nozzle.

13. The vehicle of claim 12,
wherein a nozzle opening of the fluid-expelling nozzle is at least partially separable from the airflow.

14. The vehicle of claim 8,
wherein the heat sink is located on an opposite side of the sensor housing from the cover.

15. A method of operating a sensor system at a vehicle body, the method comprising:
in response to determining, by the sensor system, via at least one sensor of the sensor system, that a sensor lens of the sensor system is at least partially obscured by at least a threshold amount, initiating, by the sensor system, via a cleaning assembly of the sensor system, a cleaning process on a portion of a sensor lens disposed within a chamber of the sensor system and at least partially separated from airflow exterior to the chamber, wherein the sensor system comprises:
a sensor housing comprising:
  the sensor lens,
  at least one sensor, and
  a heat sink attached to an outside surface of the sensor housing, and connected to the at least one sensor,
  wherein the sensor housing is moveable at least partially into and out of the chamber, and wherein the heat sink is not exposed to airflow exterior to the chamber in response to the sensor housing being moved completely into the chamber;
in response to determining, by the sensor system, via the at least one sensor of the sensor system, that the heat sink requires cooling, moving, by the sensor system, the sensor housing at least partially out of the chamber to expose the heat sink to the airflow exterior to the chamber; and
directing, by the sensor system, via a pump element and one or more drain hoses of the cleaning assembly, fluid expelled for the cleaning away from one or more viewing panels at the vehicle body.

16. The method of claim 15,
wherein the cleaning assembly is fixable relative to the vehicle body.

17. The method of claim 15, further comprising:
at least partially separating, by the sensor system, via the cleaning assembly, a nozzle opening of a fluid-expelling nozzle, configured to clean the sensor lens, from the airflow.

18. The method of claim 15, further comprising:
forming, by a cover of the sensor system, an exterior portion of the vehicle body.

19. The method of claim 18, wherein the heat sink is located on an opposite side of the housing from the cover.

20. The method of claim 15, further comprising:
expelling, by the sensor system, via the cleaning assembly, the fluid at least partially within the chamber to clean the sensor lens.

\* \* \* \* \*